United States Patent
Umemura et al.

(10) Patent No.: US 9,941,553 B2
(45) Date of Patent: Apr. 10, 2018

(54) BATTERY-CONNECTION SYSTEM, BATTERY PACK, AND METHOD OF FORMING TEMPERATURE-DETECTION CIRCUIT

(71) Applicant: MAKITA CORPORATION, Anjo-shi, Aichi (JP)

(72) Inventors: Takuya Umemura, Anjo (JP); Shunpei Yamaji, Anjo (JP)

(73) Assignee: MAKITA CORPORATION, Anjo-shi (JP)

(*) Notice: Subject to any disclaimer, the term of this patent is extended or adjusted under 35 U.S.C. 154(b) by 145 days.

(21) Appl. No.: 15/044,593

(22) Filed: Feb. 16, 2016

(65) Prior Publication Data
US 2016/0268647 A1 Sep. 15, 2016

(30) Foreign Application Priority Data
Mar. 11, 2015 (JP) .................. 2015-048611

(51) Int. Cl.
| | | |
|---|---|---|
| *H02J 7/04* | (2006.01) | |
| *H02J 7/16* | (2006.01) | |
| *H01M 10/44* | (2006.01) | |
| *H02J 7/00* | (2006.01) | |
| *H01M 10/48* | (2006.01) | |

(52) U.S. Cl.
CPC ....... *H01M 10/443* (2013.01); *H01M 10/486* (2013.01); *H02J 7/007* (2013.01); *H02J 7/0029* (2013.01); *H02J 7/0091* (2013.01)

(58) Field of Classification Search
CPC ....... H02J 7/0091; Y02E 60/12; H01M 10/44; H01M 10/443; Y02B 40/90
USPC ........................................... 320/152
See application file for complete search history.

(56) References Cited

U.S. PATENT DOCUMENTS

| | | | | |
|---|---|---|---|---|
| 5,411,816 A | * | 5/1995 | Patino | H02J 7/0006 320/152 |
| 5,550,453 A | * | 8/1996 | Bohne | H01M 10/44 320/148 |
| 5,684,386 A | * | 11/1997 | Okada | H01M 10/44 320/139 |
| 2009/0160405 A1 | * | 6/2009 | Takeda | H01M 10/0525 320/152 |
| 2010/0156356 A1 | * | 6/2010 | Asakura | H01M 10/44 320/148 |

FOREIGN PATENT DOCUMENTS

JP        H11-69645 A        3/1999

* cited by examiner

*Primary Examiner* — Arun Williams
(74) *Attorney, Agent, or Firm* — Oliff PLC

(57) ABSTRACT

A battery-connection system in one aspect of the present disclosure comprises a battery pack and a connecting device. The connecting device comprises a temperature-related control unit that is configured to execute a specific temperature-related control in accordance with a detection signal outputted from the battery pack when the battery pack is attached to the connecting device, without identifying a type of a battery in the battery pack.

16 Claims, 10 Drawing Sheets

BATTERY-CONNECTION SYSTEM, BATTERY PACK, AND METHOD OF FORMING TEMPERATURE-DETECTION CIRCUIT

CROSS-REFERENCE TO RELATED APPLICATIONS

This application claims the benefit of Japanese Patent Application No. 2015-048611 filed Mar. 11, 2015 in the Japan Patent Office, and the disclosure of which is incorporated herein by reference.

BACKGROUND

The present disclosure relates to a battery pack.

A battery charger that is configured to identify the type of a battery and controls charging of the battery in accordance with the identified type is known.

According to one example of the technique disclosed in Japanese Unexamined Patent Application Publication No. 11-69645, the type of a battery is identified by using a detected voltage that is detected by a thermistor built in a battery pack. More specifically, the detected voltage is shifted (offset) by coupling the thermistor and a resistor in series in the battery pack. Such shifted amount differs depending on the type of the battery. And the battery charger identifies the type of the battery based on the level of the detected voltage. For example, the battery charger determines that the battery is an A-type battery if the detected voltage value is equal to or smaller than a given threshold value, or a B-type battery if the detected voltage value is greater than the given threshold value.

SUMMARY

In the aforementioned example, to identify the type of a battery, a level of the detected voltage corresponding to the type of the battery (in other words, a shifted amount that corresponds to the type of the battery) needs to be stored in advance in the battery charger. Therefore, only those batteries, the types of which correspond to the levels of detected voltages stored in advance, can be identified. In the aforementioned example, it is possible to identify whether the battery is an A-type battery or a B-type battery based on the threshold value; however, new types of batteries other than the A-type or B-type cannot be identified.

In one aspect of the present disclosure, it is preferred that a connecting device to which a battery pack is attached can perform an appropriate control not in accordance with the type of a battery inside the battery pack but in accordance with a characteristic of the battery and a temperature inside the battery pack.

A battery-connection system in one aspect of the present disclosure comprises a battery pack and a connecting device that is configured such that the battery pack can be attached thereto and detached therefrom. The battery pack comprises a battery and a temperature-detection circuit that is configured to be able to output a detection signal corresponding to a temperature of a specific location inside the battery pack. The temperature-detection circuit comprises a temperature-detection element and at least one resistance element. The temperature-detection element is disposed at the specific location and possesses a resistance-temperature characteristic by which a resistance value of the temperature-detection element varies in accordance with the temperature of the specific location. The at least one resistance element is coupled to the temperature-detection element in series and/or in parallel, and has a resistance value that is determined based on the characteristic of the battery. The temperature-detection circuit is configured to be able to output the detection signal which is based on the resistance value of the temperature-detection element and the resistance value of the at least one resistance element.

The connecting device comprises an operating unit and a temperature-related control unit. The operating unit is configured to be able to execute battery-related operation, which is at least one of either operation using electric power from the battery or charging operation of the battery, when the battery pack is attached to the connecting device. The temperature-related control unit is configured to execute a specific temperature-related control in accordance with the detection signal outputted from the battery pack when the battery pack is attached to the connecting device, without identifying the type of the battery.

In the battery-connection system configured as above, the connecting device executes the temperature-related control in accordance with the detection signal outputted from the battery pack without identifying the type of the battery. Thus, the resistance value of the at least one resistance element is appropriately determined based on the characteristic of the battery, so that an appropriate temperature-related control, which is in accordance with the characteristic of the battery, is executed in the connecting device. As a result, on individual batteries with different characteristics, the connecting device can execute an appropriate temperature-related control, which is in accordance with the characteristic of each of those individual batteries and the temperature of the specific location inside the battery pack, without identifying the type of the batteries.

In the battery-connection system that is configured as mentioned above, the detection signal may indicate a detection value corresponding to the temperature of the specific location. The connecting device may be configured to compare the detection value indicated by the detection signal with a preset threshold value that is independent of the characteristic of the battery, and to execute the temperature-related control based on the result of this comparison. In this case, the temperature-detection circuit may be configured to output the detection signal, which indicates a specific detection value corresponding to the threshold value, when the temperature of the specific location has reached a specific temperature.

In the battery-connection system that is configured as mentioned above, the connecting device executes the temperature-related control by using the threshold value that is independent of the characteristic of the battery without identifying the type of the battery. Meanwhile, the temperature-detection circuit inside the battery pack is configured to output a specific detection signal (a signal that indicates the specific detection value corresponding to the threshold value) when the temperature of the specific location has reached the specific temperature. According to such a configuration, on individual batteries with different characteristics, the connecting device can execute an appropriate temperature-related control, which is in accordance with the characteristic of each of those individual batteries and the temperature of the specific location inside the battery pack, without identifying the type of the batteries.

The at least one resistance element may be coupled to the temperature-detection element in series. By coupling the at least one resistance element to the temperature-detection element in series, overall resistance value of the temperature-detection circuit can be increased in accordance with the resistance value of the at least one resistance element, and thus the detection value indicated by the detection signal can be increased. In other words, a detection value for one temperature can be shifted to a great value compared to a case where the at least one resistance element is not coupled to the temperature-detection element in series.

Thus, it is possible to have the connecting device execute an appropriate temperature-related control which is in accordance with the characteristic of the battery and the temperature of the specific location inside the battery pack, without identifying the type of the battery, by appropriately setting the resistance value of the at least one resistance element in accordance with the characteristic of the battery (in other words, by appropriately setting the shifted amount of the detection value).

In a case where the at least one resistance element is coupled to the temperature-detection element in series, the temperature-detection circuit may be configured such that the greater the resistance value of the at least one resistance element is, the higher the specific temperature at which the temperature-detection circuit outputs the detection signal indicating the specific detection value becomes.

Note that the resistance value of the at least one resistance element may be set to such a value that the temperature-detection circuit outputs the detection signal indicating the specific detection value when the temperature of the specific location is higher by a given temperature than the temperature, at which the temperature-detection circuit outputs the detection signal indicating the specific detection value when the at least one resistance element is not coupled to the temperature-detection element in series.

The resistance-temperature characteristic of the temperature-detection element may be a negative characteristic. In this case, the higher the temperature is, the smaller the resistance value of the temperature-detection element becomes, and thus, the smaller the detection value indicated by the detection signal becomes. In the connecting device, specific processing may be executed when the detection value decreases to the threshold value or below due to an increase in the temperature detected by the temperature-detection element.

If the specific processing needs to be executed at a lower temperature in the above mentioned case, the resistance value of the at least one resistance element may be smaller. The smaller the resistance value of the at least one resistance element is, the lower the actual temperature when reaching the threshold value can be. In other words, the specific processing can be executed at a lower temperature.

Contrarily, if the specific processing needs to be executed at a higher temperature, the resistance value of the at least one resistance element may be greater. The greater the resistance value of the at least one resistance element is, the higher the actual temperature when reaching the threshold value can be. In other words, specific processing can be executed at a higher temperature.

Therefore, in the case of the aforementioned example, the actual temperature, at which the specific processing is executed in the connecting device, can be appropriately adjusted by adjusting the resistance value of the at least one resistance element. More appropriate and flexible adjustment is possible particularly in circumstances where the actual temperature, at which the specific processing should be executed, needs to be higher.

The resistance value of the at least one resistance element may be equal to or below 40% of the resistance value of the temperature-detection element when the temperature is at a given temperature within a normal temperature range. The normal temperature range may be from 10° C. to 40° C.

According to the battery-connection system configured as mentioned above, the shifted amount of the detection value can be appropriately adjusted. The shifted amount at the high-temperature side can be relatively great while keeping the shifted amount down at the low-temperature side particularly in a case where the temperature-detection element possesses such characteristic that the higher the temperature becomes, the smaller the rate of change of the resistance value of the temperature-detection element becomes, while the lower the temperature becomes, the greater the rate of change of the resistance value of the temperature-detection element becomes. Thus, an execution timing for the temperature-related control (an actual temperature at which the temperature-related control should be executed) at the high-temperature side can be flexibly adjusted.

The at least one resistance element may be coupled to the temperature-detection element in parallel. By coupling the at least one resistance element to the temperature-detection element in parallel, the overall resistance value of the temperature-detection circuit can be decreased in accordance with the resistance value of the at least one resistance element, and thus the detection value indicated by the detection signal can be decreased. In other words, a detection value for one temperature can be shifted to a small value compared to a case where the at least one resistance element is not coupled to the temperature-detection element in parallel.

Thus, it is possible to have the connecting device execute an appropriate temperature-related control which is in accordance with the characteristic of the battery and the temperature of the specific location inside the battery pack, without identifying the type of the battery, by appropriately setting the resistance value of the at least one resistance element in accordance with the characteristic of the battery (in other words, by appropriately setting the shifted amount of the detection value).

In a case where the at least one resistance element is coupled to the temperature-detection element in parallel, the temperature-detection circuit may be configured such that the smaller the resistance value of the at least one resistance element is, the lower the specific temperature at which the temperature-detection circuit outputs the detection signal indicating the specific detection value becomes.

Note that the resistance value of the at least one resistance element may be set to such a value that the temperature-detection circuit outputs the detection signal indicating the specific detection value when the temperature of the specific location is lower by a given temperature than the temperature, at which the temperature-detection circuit outputs the detection signal indicating the specific detection value when the at least one resistance element is not coupled to the temperature-detection element in parallel.

The resistance-temperature characteristic of the temperature-detection element may be a negative characteristic. In the connecting device, the specific processing may be executed when the detection value increases to the threshold value or greater due to a decrease in the temperature that is detected by the temperature-detection element.

If the specific processing needs to be executed at a lower temperature in the above mentioned case, the resistance value of the at least one resistance element may be smaller. The smaller the resistance value of the at least one resistance element is, the lower the actual temperature when reaching the threshold value can be. In other words, the specific processing can be executed at a lower temperature.

Contrarily, if the specific processing needs to be executed at a higher temperature, the resistance value of the at least one resistance element may be greater. The greater the resistance value of the at least one resistance element is, the higher the actual temperature when reaching the threshold value can be. In other words, the specific processing can be executed at a higher temperature.

Therefore, in the case of the aforementioned example, the actual temperature, at which the specific processing is executed in the connecting device, can be appropriately adjusted by adjusting the resistance value of the at least one resistance element. More appropriate and flexible adjustment is possible particularly in circumstances where the actual temperature, at which the specific processing should be executed, needs to be lower.

The resistance value of the at least one resistance element may be four times or more of the resistance value of the temperature-detection element when the temperature is at a given temperature within the normal temperature range. The normal temperature range may be from 10° C. to 40° C.

According to the battery-connection system configured as mentioned above, the shifted amount of the detection value can be appropriately adjusted. The shifted amount at the low-temperature side can be relatively great while keeping the shifted amount down at the high-temperature side particularly in a case where the temperature-detection element possesses such characteristic that the higher the temperature becomes, the smaller the rate of change of the resistance value of the temperature-detection element becomes, while the lower the temperature becomes, the greater the rate of change of the resistance value of the temperature-detection element becomes. Thus, an execution timing for the temperature-related control (the actual temperature at which the temperature-related control should be executed) at the low-temperature side can be flexibly adjusted.

If the resistance-temperature characteristic of the temperature-detection element is a negative characteristic, then the battery-connection system may comprise a series circuit that is coupled to the temperature-detection element in parallel. This series circuit may comprise the at least one resistance element and a Zener diode that is coupled to the at least one resistance element in series.

In the battery-connection system configured as mentioned above, the Zener diode does not break down while a voltage between both ends of the temperature-detection element is low; and the series circuit does not function practically. A voltage applied to the series circuit increases as the voltage between both ends of the temperature-detection element increases. The Zener diode breaks down at a specific voltage value, and then an electric current flows not only to the temperature-detection element but also to the series circuit.

Thus, if the resistance-temperature characteristic of the temperature-detection element is a negative characteristic, then the series circuit can be applied to such an application, in which the series circuit is made not to function in a region where the temperature is at or above a given fixed temperature but is made to function and shift the detection value only in a region where the temperature is below the fixed temperature.

The temperature-detection element may comprise any temperature-detection element; for example, it may comprise a thermistor.

Another aspect of the present disclosure is a battery pack comprised in the aforementioned battery-connection system. Such a battery pack can be used in the aforementioned battery-connection system, and various effects as mentioned above can be attained thereby.

A battery pack in yet another aspect of the present disclosure comprises a battery, and a temperature-detection circuit that is configured to be able to output a detection signal indicating a detection value corresponding to a temperature at a specific location inside the battery pack.

The temperature-detection circuit comprises a temperature-detection element and at least one resistance element. The temperature-detection element is disposed at the specific location and is configured such that the resistance value of the temperature-detection element varies in accordance with the temperature of the specific location. The at least one resistance element is coupled to the temperature-detection element in series and/or in parallel.

The temperature-detection circuit is configured to be able to output the detection signal which is based on the resistance value of the temperature-detection element and the resistance value of the at least one resistance element; and is configured such that the detection signal outputted by the temperature-detection circuit indicates a content that corresponds to a control parameter when the temperature of the specific location has reached a specific temperature. The control parameter is act on an external device to which the battery pack is attached; the parameter does not depend on the characteristic of the battery.

In the battery pack configured as mentioned above, the temperature-detection circuit may be configured to output a specific detection signal (a signal indicating a content that corresponds to the control parameter on the connecting device) when the temperature of the specific location reaches the specific temperature.

By such a configuration, it is possible to have the connecting device execute an appropriate temperature-related control to individual batteries with different characteristics in accordance with the characteristics of those individual batteries and the temperature of the specific location inside the battery pack, without identifying the type of those batteries.

The temperature-detection element may comprise any temperature-detection element: for example, a thermistor.

Yet another aspect of the present disclosure is a method of forming a temperature-detection circuit of a battery in a battery pack.

This method comprises, providing a temperature-detection element at a specific location in the battery pack, the temperature-detection element being configured such that a resistance value of the temperature-detection element varies in accordance with a temperature of the specific location; and, providing at least one resistance element, which is coupled to the temperature-detection element in series and/or in parallel, to the battery pack; the at least one resistance element having a specific resistance value; the specific resistance value being set such that a combined resistance value, which combines the resistance value of the temperature-detection element in a case where the temperature of the specific location reaches a specific temperature with the specific resistance value, corresponds to control parameter; and, the control parameter being set on an external device to which the battery pack is attached, and being independent of a characteristic of the battery.

If the temperature-detection circuit is formed in the battery pack by means of such a method, then the external device can execute an appropriate temperature-related control to individual batteries with different characteristics in accordance with the characteristics of those individual batteries and the temperature of the specific location inside the battery pack, without identifying the type of those batteries.

BRIEF DESCRIPTION OF THE DRAWINGS

An exemplary embodiment of the present disclosure will be described hereinafter by way of example with reference to the accompanying drawings, in which.

DETAILED DESCRIPTION OF THE PREFERRED EMBODIMENTS

First Embodiment (1) Configuration of Charging System

Figure 1:
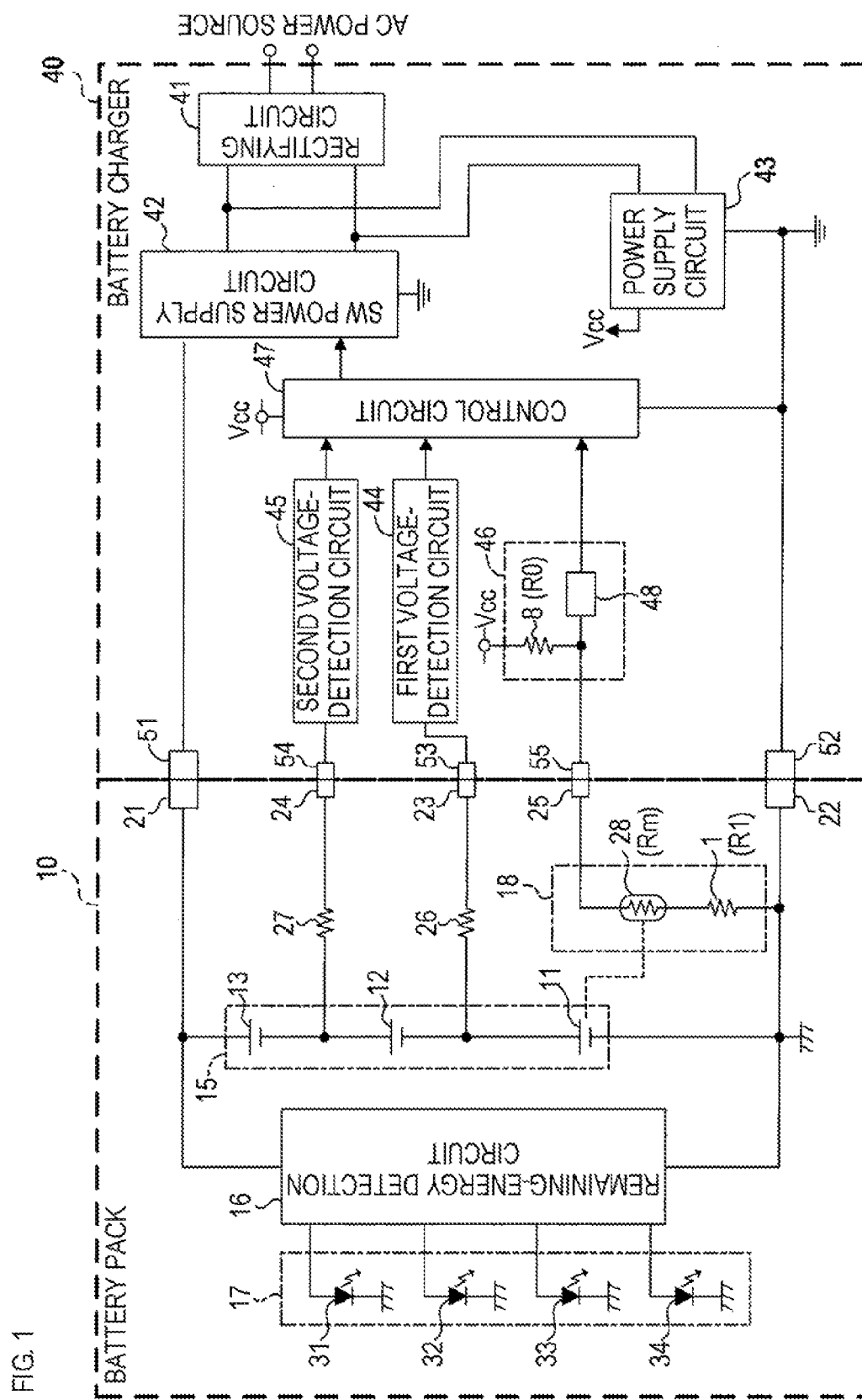
FIG. 1 is a configuration diagram showing a schematic configuration of a charging system of a first embodiment.

As shown in FIG. 1, the charging system of the present first embodiment comprises a battery pack 10 and a battery charger 40. The battery pack 10 is configured to be attachable to and detachable from the battery charger 40. FIG. 1 shows a state in which the battery pack 10 is attached to the battery charger 40. The battery pack 10 is configured attachable to and detachable from not only the battery charger 40 but also various external devices including a tool body 60 (see FIG. 2), which will be mentioned later.

The battery pack 10 comprises a positive-electrode terminal 21; a negative-electrode terminal 22; a first output-terminal 23; a second output-terminal 24; and, a detection terminal 25, as terminals that are coupled to an external device mechanically and electrically when attached to the external device. Meanwhile, the battery charger 40 comprises a positive-electrode terminal 51; a negative-electrode terminal 52; a first input-terminal 53; a second input-terminal 54; and, a detection terminal 55.

As shown in FIG. 1, when the battery pack 10 is attached to the battery charger 40, the positive-electrode terminal 21 and the positive-electrode terminal 51 are electrically coupled; the negative-electrode terminal 22 and the negative-electrode terminal 52 are electrically coupled; the first output-terminal 23 and the first input-terminal 53 are electrically coupled; the second output-terminal 24 and the second input-terminal 54 are electrically coupled; and, the detection terminal 25 and the detection terminal 55 are electrically coupled.

As shown in FIG. 1, the battery pack 10 comprises a battery 15; a remaining-energy detection circuit 16; a remaining-energy display 17; and a temperature-detection circuit 18.

The battery 15 comprises two or more secondary cells that are coupled in series. To be specific, in the battery 15 of the present first embodiment, a first cell 11, a second cell 12, and a third cell 13 are coupled in series. These cells 11 to 13 possesses the same temperature characteristic and the same electrical characteristic.

The positive electrode of the battery 15 (that is, a positive electrode of the third cell 13) is coupled to the positive-electrode terminal 21 and the remaining-energy detection circuit 16 of the battery pack 10. The negative electrode of the battery 15 (that is, a negative electrode of the first cell 11) is coupled to the negative-electrode terminal 22 and the remaining-energy detection circuit 16 of the battery pack 10. Thus, discharging from the battery 15 to the external device is carried out via the positive-electrode terminal 21 and the negative-electrode terminal 22; and likewise, supply of charging electricity from the external device to the battery 15 is carried out via the positive-electrode terminal 21 and the negative-electrode terminal 22.

A positive electrode of the first cell 11 of the battery 15 is coupled to the first output-terminal 23 via a resistor 26. The first output-terminal 23 outputs a first-cell voltage signal that indicates the voltage value of the first-cell 11. A positive electrode of the second cell 12 of the battery 15 is coupled to the second output-terminal 24 via a resistor 27. The second output-terminal 24 outputs a second-cell voltage signal that indicates a voltage value of the second cell 12.

The remaining-energy detection circuit 16 detects remaining energy of the battery 15, and operates the remaining-energy display 17 in accordance with the detected remaining energy. The remaining-energy display 17 comprises four LEDs 31 to 34. The remaining-energy detection circuit 16 notifies of information that shows the remaining energy of the battery 15 by controlling the lighting on or off of the four LEDs 31 to 34 in accordance with the remaining energy of the battery 15. For example, when the remaining energy in the fully-charged battery 15 is deemed 100%, all of the four LEDs 31 to 34 are lit on if the remaining energy is, for example, 80% or more; three LEDs 31 to 33 are lit on if the remaining energy is, for example, from 60% to less than 80%; two LEDs 31 and 32 are lit on if the remaining energy is, for example, from 40% to less than 60%; one LED 31 is lit on if the remaining energy is, for example, from 20% to less than 40%; and, all of the four LEDs 31 to 34 are turned off if the remaining energy is, for example, less than 20%.

The temperature-detection circuit 18 is disposed to detect the temperature of the battery 15 (hereinafter referred to as "the battery temperature"). The temperature-detection circuit 18 comprises a thermistor 28 and a resistor 1; the thermistor 28 and the resistor 1 are coupled in series. One end of the temperature-detection circuit 18 (one end of the thermistor 28) is coupled to the detection terminal 25; the other end of the temperature-detection circuit 18 (one end of the resistor 1) is coupled to the negative-electrode terminal 22.

In the first embodiment, the thermistor 28 is a so-called NTC thermistor whose resistance-temperature characteristic is a negative characteristic. In other words, resistance value Rm of the thermistor 28 becomes lower as the ambient temperature of the thermistor 28 detected by the thermistor 28 becomes higher; the temperature and the resistance value Rm are approximately in inverse proportion.

The thermistor 28 is located in the vicinity of the battery 15 to detect the battery temperature properly. Thus, the resistance value Rm of the thermistor 28 varies in accordance with the battery temperature; the higher the battery temperature becomes, the lower the resistance value Rm becomes. Note that the arrangement of the thermistor 28 can be appropriately determined as long as it can properly detect the temperature of the object of detection (which is the battery 15 in the present first embodiment).

When the overall resistance value of the temperature-detection circuit 18 is detected resistance value Rs, the detected resistance value Rs is expressed in the following formula (1). R1 is a resistance value of the resistor 1.

$$Rs = Rm + R1 \quad (1)$$

Therefore, the detected resistance value Rs varies in accordance with the battery temperature; the higher the battery temperature becomes, the lower the detected resistance value Rs becomes.

If the battery pack 10 is coupled to the battery charger 40, one end of the thermistor 28 in the temperature-detection circuit 18 is coupled to a control power supply line that supplies control voltage Vcc, which will be explained later, via a resistor 8 in the battery charger 40. Thus, the detection terminal 25 in the battery pack 10 outputs a detection signal Vs that has a voltage, which is the control voltage Vcc divided between the temperature-detection circuit 18 and the resistor 8. A voltage value of the detection signal Vs can be expressed precisely in the following formula (2). R0 is a resistance value of the resistor 8.

$$Vs = Vcc \cdot Rs / (Rs + R0) \quad (2)$$

Therefore, the voltage value of the detection signal Vs varies in accordance with the battery temperature; the higher the battery temperature becomes, the lower the voltage value of the detection signal Vs becomes. The voltage value of the detection signal Vs depends on the detected resistance value Rs and varies in accordance with variation in the detected resistance value Rs (that is, variation in the temperature). Thereby, the detection signal Vs may also be seen as information indicating the detected resistance value Rs.

The battery charger 40 comprises a rectifying circuit 41; a switching (SW) power supply circuit 42; a power supply circuit 43; a first voltage-detection circuit 44; a second voltage-detection circuit 45; a detection-signal input circuit 46; and, a control circuit 47 as shown in FIG. 1.

The rectifying circuit 41 converts alternating current (AC) voltage inputted from outside of the battery charger 40 (for example, commercial AC voltage of 100V) to direct current (DC) voltage. The SW power supply circuit 42 comprises a switching regulator that lowers the inputted voltage and outputs the same. More specifically, the SW power supply circuit 42 lowers the rectified voltage, which is converted to the DC voltage by the rectifying circuit 41, to DC voltage for charging that has a specified voltage value and outputs this DC voltage for charging from the positive-electrode terminal 51.

The power supply circuit 43 lowers the rectified voltage, which is converted to the DC voltage by the rectifying circuit 41, to generate and output DC control voltage Vcc that has a specified voltage value. The control voltage Vcc is used as power supply voltage for operation of each part inside the battery charger 40, including the control circuit 47 and the detection-signal input circuit 46.

The first voltage-detection circuit 44 detects the voltage value of the first-cell 11 (first-cell voltage value) based on the first-cell voltage signal inputted from the battery pack 10 via the first input-terminal 53, and outputs information indicating this first-cell voltage value to the control circuit 47. The second voltage-detection circuit 45 detects voltage value of the second cell 12 (second-cell voltage value) based on the second-cell voltage signal inputted from the battery pack 10 via the second input-terminal 54, and outputs information indicating this second-cell voltage value to the control circuit 47.

The detection-signal input circuit 46 comprises the aforementioned resistor 8 and a filter 48. As it is already mentioned, one end of the resistor 8 is coupled to the control power supply line and is applied with the control voltage Vcc. The other end of the resistor 8 is coupled to the detection terminal 55. When the battery pack 10 is attached to the battery charger 40, the other end of the resistor 8 is coupled to one end of the temperature-detection circuit 18 (more specifically, one end of the thermistor 28) via the detection terminal 55 and the detection terminal 25 of the battery pack 10.

By such a configuration, the detection signal Vs from the temperature-detection circuit 18 of the battery pack 10 is inputted to the detection-signal input circuit 46. And noise components included in the inputted detection signal Vs (for example, a component of high frequency which is equal to or higher than a given frequency) is removed by the filter 48 and the detection signal Vs is inputted into the control circuit 47.

The control circuit 47 controls charging of the battery 15 by controlling operation of the SW power supply circuit 42 based on various information such as information inputted from the first voltage-detection circuit 44; information inputted from the second voltage-detection circuit 45; and, the detection signal Vs inputted from the battery pack 10 via the detection-signal input circuit 46.

Each control by the control circuit 47 comprises at least basic charge control and temperature protection control. The basic charge control is a control to charge the battery 15 until the battery 15 is fully charged by supplying the battery 15 with a charging voltage and to stop the charging of the battery 15 when the battery 15 is fully charged by stopping supply of the charging voltage. In other words, it is a basic control to charge the battery 15 inside the attached battery pack 10.

The temperature protection control is a control to monitor the battery temperature based on the detection signal Vs inputted via the detection-signal input circuit 46 and to forcibly stop the charging of the battery 15 in accordance with the monitoring results (in other words, in accordance with the voltage value of the detection signal Vs).

To be more specific, the charging of the battery 15 is forcibly stopped while the battery 15 is charged by the basic charge control when the battery temperature becomes high and the voltage value of the detection signal Vs becomes equal to or lower than a given voltage-threshold-value Vth1. The voltage-threshold-value Vth1 is a threshold value to determine whether the temperature of the battery 15 is at a high temperature which is specified in advance. If the voltage value of the detection signal Vs becomes equal to or lower than the voltage-threshold-value Vth1 due to overheating of the battery 15, then the charging is forcibly stopped even when the charging by the basic charge control is still in progress and the battery 15 is not fully charged.

In addition, while the battery 15 is being charged by the basic charge control, the charging of the battery 15 is forcibly stopped also when the battery temperature becomes low and the voltage value of the detection signal Vs becomes equal to or higher than a given voltage-threshold-value Vth2. The voltage-threshold-value Vth2 is a threshold value to determine whether the temperature of the battery 15 is at a low temperature which is specified in advance. Even though the charging of the battery 15 by the basic charge control is still in progress and the battery 15 is not fully charged yet, the charging is forcibly stopped if the temperature of the battery 15 keeps being lowered due to some factors such as of the surrounding environment and the voltage value of the detection signal Vs becomes equal to or higher than the voltage-threshold-value Vth2. Both of the voltage-threshold-value Vth1 and the voltage-threshold-value Vth2 are not individually set for different types of the battery 15; they are set independently of the type of the battery 15.

In other words, the control circuit 47 of the battery charger 40 executes the temperature protection control in accordance with the voltage value of the detection signal Vs without identifying the type of the battery 15. That is to say that, without identifying the type of the battery 15, the control circuit 47 permits charging when the voltage value of the detection signal Vs is within a range of values higher than the voltage-threshold-value Vth1 and lower than the voltage-threshold-value Vth2 (hereinafter also referred to as "permitted voltage range for charging") but forcibly stops the charging when the voltage value of the detection signal Vs is not within the permitted voltage range for charging due to overheating or overcooling.

(2) Configuration of Electric Power Tool

Figure 2:
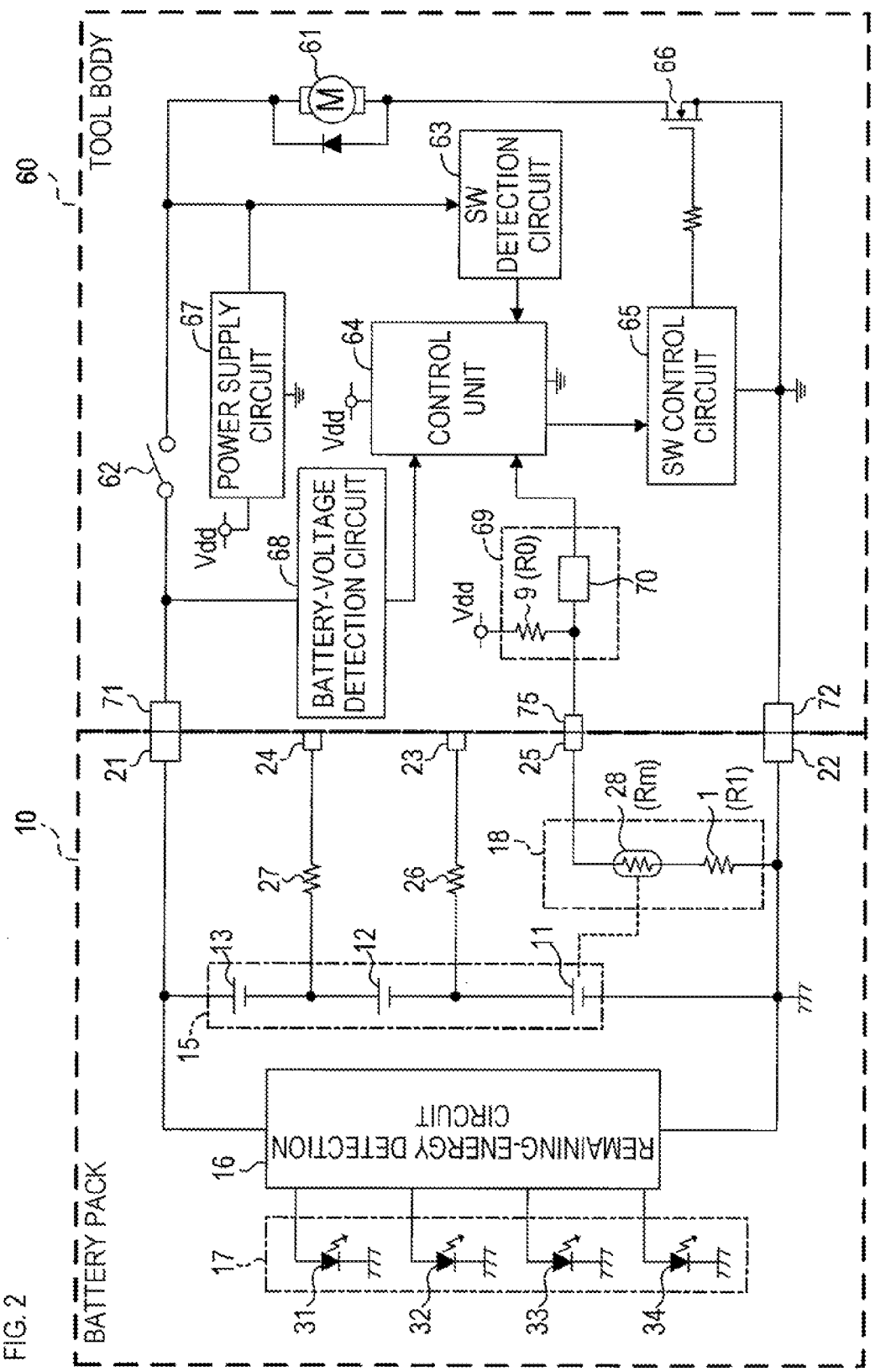
FIG. 2 is a configuration diagram showing a schematic configuration of an electric power tool of the first embodiment.

As shown in FIG. 2, an electric power tool of the present first embodiment comprises a battery pack 10 and a tool body 60. The tool body 60 is configured such that the battery pack 10 can be attached to and detached from the tool body 60. FIG. 2 shows a state in which the battery pack 10 is attached to the tool body 60.

Since the battery pack 10 has the same configuration as that of the battery pack 10 in the charging system shown in FIG. 1, its explanation is omitted.

The tool body 60 comprises a positive electrode terminal 71; a negative electrode terminal 72; and, a detection terminal 75. As shown in FIG. 2, when the battery pack 10 is attached to the tool body 60, the positive-electrode terminal 21 and the positive electrode terminal 71 are electrically coupled; the negative-electrode terminal 22 and the negative electrode terminal 72 are electrically coupled; and, the detection terminal 25 and the detection terminal 75 are electrically coupled.

The tool body 60 comprises a motor 61; a trigger switch 62; a switch (SW) detection circuit 63; the control unit 64; a switching control circuit 65; a conduction control switch 66; a power supply circuit 67; a battery-voltage detection circuit 68; and, a detection-signal input circuit 69 as shown in FIG. 2.

The trigger switch 62 is disposed upstream of the motor 61 and the conduction control switch 66 is disposed downstream of the motor 61 in a conduction path from the positive electrode terminal 71, via the motor 61, to the negative electrode terminal 72. The trigger switch 62 is a switch which is operated by a user of the electric power tool.

Voltage of the battery 15 (battery voltage) is inputted into the power supply circuit 67 via the trigger switch 62 when the trigger switch 62 is turned on. After the battery voltage is inputted, the power supply circuit 67 lowers the battery voltage to a control voltage Vdd at a specified voltage value and outputs the control voltage Vdd. The control voltage Vdd generated in the power supply circuit 67 is used as power supply voltage for operation of each part inside the tool body 60 including the control unit 64 and the detection-signal input circuit 69.

The switch detection circuit 63 detects the operating status of the trigger switch 62 and outputs a signal indicating the detected result to the control unit 64. The battery-voltage detection circuit 68 detects a voltage value of the battery voltage of the battery 15 inside the battery pack 10 attached to the tool body 60, and outputs a signal indicating the voltage value to the control unit 64.

The detection-signal input circuit 69 comprises a resistor 9 and a filter 70. One end of the resistor 9 is coupled to a control power supply line that supplies the control voltage Vdd and applied with the control voltage Vdd. The other end of the resistor 9 is coupled to the detection terminal 75. When the battery pack 10 is attached to the tool body 60, the other end of the resistor 9 is coupled to one end of the temperature-detection circuit 18 (more specifically, one end of the thermistor 28) via the detection terminal 75 and the detection terminal 25 of the battery pack 10.

By such a configuration, the detection signal Vs from the temperature-detection circuit 18 of the battery pack 10 is inputted to the detection-signal input circuit 69. And noise components included in the inputted detection signal Vs (for example, a component of high frequency which is equal to or higher than a given frequency) is removed by the filter 70 and the detection signal Vs is inputted into the control unit 64.

The control unit 64 of the present first embodiment is a microcomputer comprising a CPU; a ROM; a RAM; an I/O and the like. Alternatively, the control unit 64 may be configured by combining various electronic components; or, it may be an ASIC (Application Specified Integrated Circuit); or, it may be a programmable logic device such as an FPGA (Field Programmable Gate Array); or it may be a combination of the above. Once the control unit 64 detects that the trigger switch 62 is turned on via the switch detection circuit 63, the control unit 64 outputs a drive command corresponding to a target rotational speed, which corresponds to the amount of operation of the trigger switch 62, to the switching control circuit 65 in order to rotate the motor 61 at the target rotational speed. In the present first embodiment, the drive command is a command to indicate a duty ratio. The switching control circuit 65 drives the motor 61 when the drive command is inputted from the control unit 64 by turning on or off the conduction control switch 66 in accordance with the duty ratio indicated by the drive command.

Note that the motor 61 is a brushed DC motor in the present first embodiment; however, it is only an example. Also, the conduction control switch 66 is an N-channel MOSFET in the present first embodiment; however, it is again only an example.

When the motor 61 rotates, an unillustrated tool element is operated by the rotation drive force; and thereby functions as an electric power tool are exerted. The motor 61 stops as the control unit 64 stops output of the drive command and the switching control circuit 65 turns off the conduction control switch 66 accordingly when the trigger switch 62 is turned off.

The control unit 64 executes the temperature protection control while the trigger switch 62 is turned on and the motor 61 is being driven, in other words, while electric power is supplied from the battery 15 to the motor 61 and the motor 61 is being driven. More specifically, discharging from the battery 15 to the motor 61 is forcibly stopped by turning off the conduction control switch 66 when the battery temperature becomes higher and the voltage value of the detection signal Vs becomes equal to or lower than a given voltage-threshold-value Vthd even if the trigger switch 62 is turned on. The voltage-threshold-value Vthd is a threshold value to determine whether the temperature of the battery 15 is at a temperature where discharging from the battery 15 to the motor 61 should be stopped. The voltage-threshold-value Vthd is not set individually for each type of the battery 15; it is set independently of the type of the battery 15.

In other words, the control unit 64 of the tool body 60 executes the temperature protection control in accordance with the voltage value of the detection signal Vs without identifying the type of the battery 15. That is to say that, without identifying the type of the battery 15, the control unit 64 permits discharging from the battery 15 to the motor 61 when the voltage value of the detection signal Vs is within a range of values higher than the voltage-threshold-value Vthd (hereinafter also referred to as "permitted voltage range for discharging") but forcibly stops the discharging when the voltage value of the detection signal Vs is not within the permitted voltage range for discharging due to overheating and the like.

(3) Method of Designing Temperature-Detection Circuit

Next, more detailed explanation of the temperature-detection circuit 18 in the battery pack 10 will be provided, with a particular focus on a method of determining a resistance value R1 of the resistor 1 which is coupled to the thermistor 28 in series.

In the present first embodiment, both the battery charger 40, which is used with the battery pack 10 attached thereto, and the tool body 60 execute the temperature protection control in accordance with the voltage value of the detection signal Vs outputted from the battery pack 10. In other words, the battery charger 40 and the tool body 60 execute the temperature protection control in accordance with the detected resistance value Rs, which is the overall resistance value of the temperature-detection circuit 18 (the combined resistance value of the thermistor 28 and the resistor 1 in series). However, neither the battery charger 40 nor the tool body 60 identify the battery 15 when executing the temperature protection control in accordance with the voltage value of the detection signal Vs.

Meanwhile, in the battery pack 10, temperatures to execute such protective operation varies depends on the type of the installed battery 15. For example, while there is a type A battery which possesses a characteristic of being resistant to high temperature, for example, being resistant to heat increase up to around 70° C., there is a type B battery which possesses a characteristic of being susceptible to high temperature, and therefore, charge and discharging should be stopped once the temperature exceeds, for example, about 50° C.

If the configuration of the temperature-detection circuit 18 is the same regardless of such variations of the type of the installed battery 15, it is inevitably impossible to execute the temperature protection control that is in accordance with and appropriate for the characteristic of the battery 15.

Thus, in the present first embodiment, the resistance value (hereinafter also referred to as "series resistance value") R1 of the resistor (hereinafter also referred to as "series resistor") 1 that is coupled to the thermistor 28 in series in the temperature-detection circuit 18 is determined based on the characteristic of the battery 15 and the control parameters used in the temperature protection control in the external device to which the battery pack 10 is attached. The characteristic of the battery 15 here refer to a characteristic particularly with respect to temperatures; in other words, resistance to temperatures.

Figure 3:
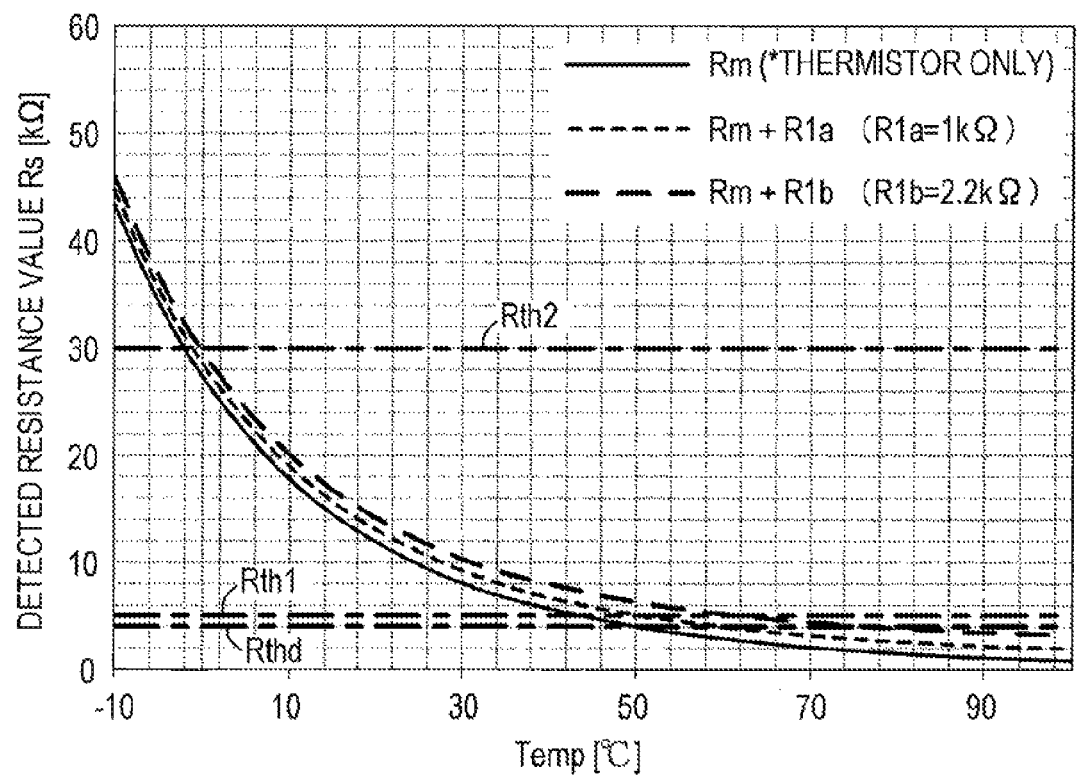
FIG. 3 is an explanatory diagram showing a temperature characteristic of a detected resistance value Rs of a temperature-detection circuit.

FIG. 3 shows an example of a temperature characteristic of the detected resistance value Rs. FIG. 3 shows the temperature characteristic of the detected resistance value Rs for each of the cases where the series resistance value R1 is altered in three ways: R1=0 (which is, a case where the series resistor 1 is not coupled to the thermistor 28 and only the thermistor 28 exists); R1=R1a=1 kΩ; and, R1=R1b=2.2 kΩ.

As shown in FIG. 3, the temperature characteristic of the thermistor 28 of the present first embodiment is a negative characteristic. More specifically, the higher the temperature becomes, the smaller the rate of change of the resistance value of the thermistor 28 becomes; the lower the temperature becomes, the greater the rate of change of the resistance value of the thermistor 28 becomes. The characteristic of the detected resistance value Rs in a case where the series resistor 1 is coupled to the thermistor 28 is the same as that in the case where only the thermistor 28 exists, with a shift by the series resistance value R1.

The voltage value of the detection signal Vs outputted from the temperature-detection circuit 18 depends on the detected resistance value Rs; it becomes smaller as the detected resistance value Rs becomes smaller. Therefore, generally, the temperature characteristic of the detected resistance value Rs shown in FIG. 3 can be regarded as the temperature characteristic of the detection signal Vs. In other words, the temperature characteristic of the detection signal Vs is as nearly equally negative characteristic as that of the detected resistance value Rs; thus, the temperature characteristic of the detection signal Vs is the same as the characteristic in the case where only the thermistor 28 exists, with a shift which depends on the series resistance value R1.

Meanwhile, the voltage-threshold-value Vth1 and the voltage-threshold-value Vth2, which are independent of the characteristic or the like of the battery 15 in the battery pack 10, are set on the battery charger 40 as mentioned above. The battery charger 40 forcibly stops charging when the voltage value of the detection signal Vs inputted from the battery pack 10 is not within the permitted voltage range for charging (in other words, when it is either in the high-temperature side where Vs<Vth1, or in the low-temperature side where Vs>Vth2).

Each of the aforementioned voltage-threshold-values Vth1 and Vth2 which are actually set on the battery charger 40 are threshold values for the voltage value of the detection signal Vs; from the different perspective, these can be considered as threshold values for the detected resistance value Rs which is the overall resistance value of the temperature-detection circuit 18. In other words, when the detected resistance value Rs in a case where the voltage value of the detection signal Vs matches the voltage-threshold-value Vth1 is called a resistance threshold value Rth1, and the detected resistance value Rs in a case where the voltage value of the detection signal Vs matches the voltage-threshold-value Vth2 is called a resistance threshold value Rth2, it can be regarded that the resistance threshold value Rth1 and the resistance threshold value Rth2 are set on the battery charger 40. Thus, it can be regarded that the battery charger 40 obtains the detected resistance value Rs from the battery pack 10 and permits charging when the detected resistance value Rs is within a range of values higher than the resistance threshold value Rth1 and lower than the resistance threshold value Rth2 (hereinafter also referred to as "permitted resistance range for charging") but forcibly stops the charging when the detected resistance value Rs is not within the permitted resistance range for charging.

Likewise, in the tool body 60, when the detected resistance value Rs in a case where the voltage value of the detection signal Vs matches the voltage-threshold-value Vthd is called a resistance threshold value Rthd, it can be regarded that the resistance threshold value Rthd is set on the tool body 60. Thus, it can be regarded that the tool body 60 obtains the detected resistance value Rs from the battery pack 10 and permits discharging from the battery 15 to the motor 61 when the detected resistance value Rs is within a range of values higher than the resistance threshold value Rthd (hereinafter also referred to as "permitted resistance range for discharging") but forcibly stops the discharging to the motor 61 when the detected resistance value Rs is not within the permitted resistance range for discharging (in other words, the detected resistance value Rs is equal to or smaller than the resistance threshold value Rthd).

Hereinafter, explanations of the relation between the detection signal Vs outputted from the temperature-detection circuit 18 and the voltage-threshold-values Vth1 and Vth2 set on the battery charger 40 will be provided appropriately as a substitute for explanations of the practically equivalent relation between the detected resistance value Rs in the temperature-detection circuit 18 and the resistance threshold values Rth1 and Rth2. Likewise, for the tool body 60, explanations of the relation between the detection signal Vs outputted from the temperature-detection circuit 18 and the voltage-threshold-value Vthd set on the tool body 60 will be provided appropriately as a substitute for explanations of the practically equivalent relation between the detected resistance value Rs in the temperature-detection circuit 18 and the resistance threshold value Rthd.

Figure 4A:
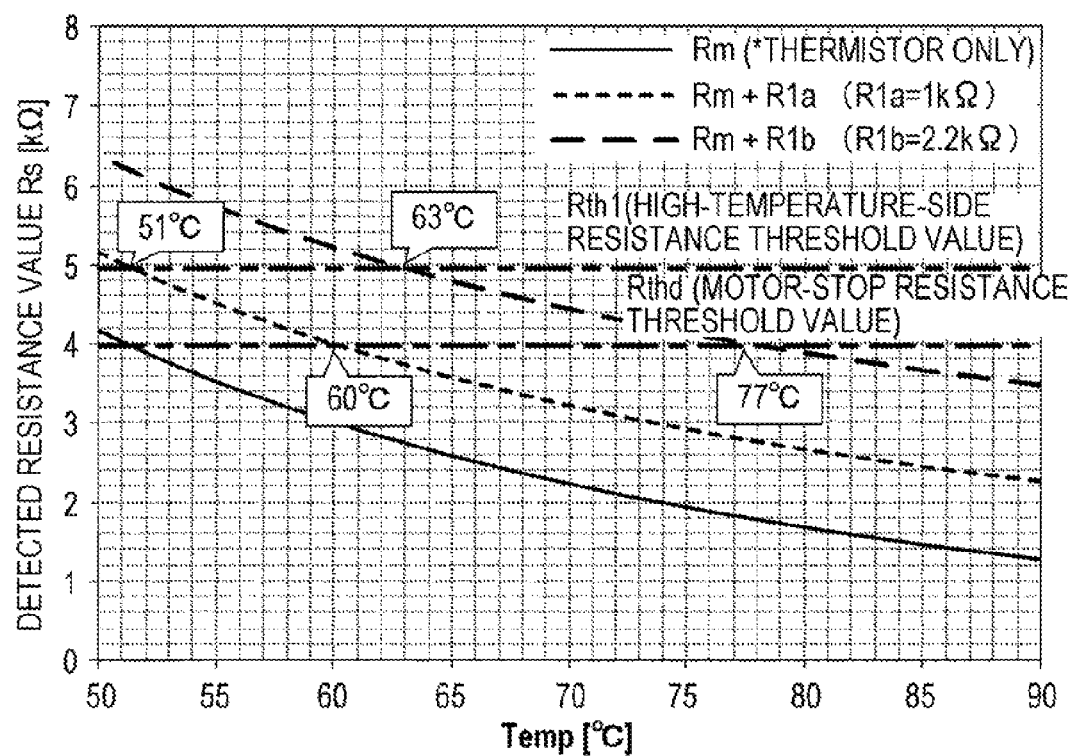
FIG. 4A is an enlarged view that magnifies a region of a high-temperature side of the temperature characteristic shown in FIG. 3.

In the battery charger 40, the resistance threshold value Rth1 which is independent of the type of the battery 15 of the battery pack 10 is set in advance. A protective function is activated when the detected resistance value Rs of the temperature-detection circuit 18 becomes equal to or smaller than the resistance threshold value Rth1, and the charging is forcibly stopped. Note that the value of the resistance threshold value Rth1 is 5 kΩ, for example. The temperature characteristic of the detected resistance value Rs is as shown in FIG. 3; among which, particularly the temperature characteristic in the high-temperature side region is as shown in FIG. 4A. The temperature characteristic of the detected resistance value Rs can be shifted by adjusting the series resistance value R1 of the series resistor 1 that is coupled to the thermistor 28 in series as shown in FIG. 4A.

As exemplified in FIG. 4A, in a case where there is, for example, no series resistor 1 but only the thermistor 28 exists, the temperature at which the protective function is activated in the high-temperature side (in other words, the temperature at which the detected resistance value Rs matches the resistance threshold value Rth1 by decreasing due to a temperature increase) is about 45° C. On the contrary, if the series resistor 1 with the series resistance value R1=R1a=1 kΩ is coupled to the thermistor 28 in series, for example, then the temperature at which the protective function is activated in the high-temperature side is about 51° C. In addition, if the series resistance value R1 is increased, for example, to R1=R1b=2.2 kΩ, then the temperature at which the protective function is activated in the high-temperature side is about 63° C.

That is to say that, the actual temperature at which the protective function is activated in the high-temperature side can be adjusted by adjusting the series resistance value R1. More specifically, the greater the series resistance value R1 is, the higher the actual temperature at which the protective function is activated in the high-temperature side can be. Thus, for example, in a case where the protective function needs to be activated when the battery temperature becomes equal to or higher than 60° C., the series resistance value R1 may be determined such that the detected resistance value Rs matches the resistance threshold value Rth1 when the battery temperature is 60° C. More specifically, the series resistance value R1 can be obtained based on the resistance value of the thermistor 28 when the battery temperature is 60° C. and the resistance threshold value Rth1.

Note that, of the control parameters, one that corresponds to the high-temperature side region which is actually set on the battery charger 40 is the voltage-threshold-value Vth1. Thus, the aforementioned example of when the battery temperature is 60° C. can be explained in a different way; that is, the series resistance value R1 may be determined such that the voltage value of the detection signal Vs matches the voltage-threshold-value Vth1 when the battery temperature is 60° C. More specifically, the series resistance value R1 can be obtained based on the resistance value of the thermistor 28 when the battery temperature is 60° C.; the voltage-threshold-value Vth1; a resistance value R0 of the resistor 8 of the detection-signal input circuit 46; and the voltage value of the control voltage Vcc.

The temperature at which the protective function should be activated (the temperature at which the detected resistance value Rs matches the resistance threshold value Rthd by decreasing due to a temperature increase) also varies in accordance with the detected resistance value Rs in the tool body 60.

As exemplified in FIG. 4A, in a case where there is, for example, no series resistor 1 but only the thermistor 28 exists, the temperature at which the protective function is activated in the high-temperature side is about 51° C. On the contrary, if the series resistor 1 with the series resistance value R1=R1a=1 kΩ is coupled to the thermistor 28 in series, for example, then the temperature at which the protective function is activated in the high-temperature side is about 60° C. In addition, if the series resistance value R1 is increased, for example, to R1=R1b=2.2 kΩ, then the temperature at which the protective function is activated in the high-temperature side is about 77° C. Note that an example of the resistance threshold value Rthd is 4 kg.

That is to say that, the actual temperature at which the protective function is activated in the tool body 60 can be adjusted by adjusting the series resistance value R1. For example, in a case where the protective function needs to be activated when the battery temperature becomes equal to or higher than 60° C., the series resistance value R1 may be determined such that the detected resistance value Rs matches the resistance threshold value Rthd when the battery temperature is 60° C. More specifically, the series resistance value R1 can be obtained based on the resistance value of the thermistor 28 when the battery temperature is 60° C. and the resistance threshold value Rthd.

Note that one of the control parameters actually set on the tool body 60 is the voltage-threshold-value Vthd. Thus, the aforementioned example of when the battery temperature is 60° C. can be explained in a different way; that is, the series resistance value R1 may be determined such that the voltage value of the detection signal Vs matches the voltage-threshold-value Vthd when the battery temperature is 60° C. More specifically, the series resistance value R1 can be obtained based on the resistance value of the thermistor 28 when the battery temperature is 60° C.; the voltage-threshold-value Vthd; the resistance value R0 of the resistor 9 of the detection-signal input circuit 69; and, the voltage value of the control voltage Vdd.

The resistance threshold value Rth2 which is independent of the type of the battery 15 of the battery pack 10 is set in advance in the battery charger 40 in addition to the resistance threshold value Rth1; the protective function is activated when the detected resistance value Rs of the temperature-detection circuit 18 becomes equal to or greater than the resistance threshold value Rth2, and the charging is forcibly stopped.

Figure 4B:
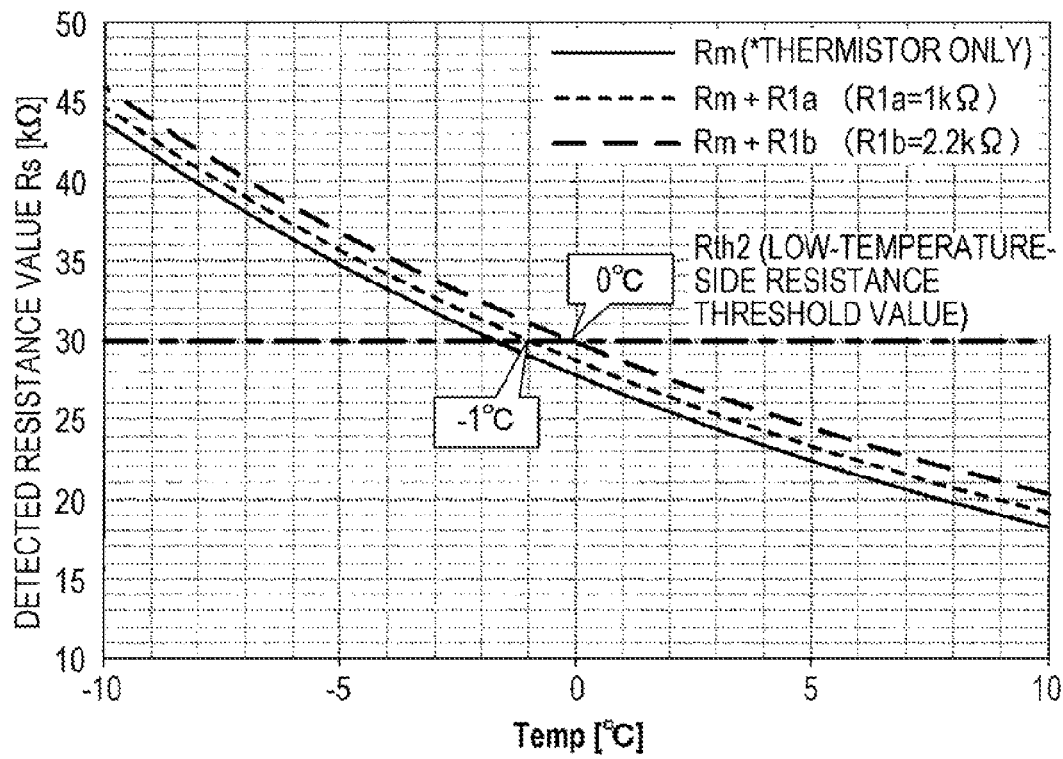
FIG. 4B is an enlarged view that magnifies a region of a low-temperature side of the temperature characteristic shown in FIG. 3.

Of the temperature characteristics of the detected resistance value Rs, particularly the temperature characteristic of the low-temperature side region is as shown in FIG. 4B. Note that an example of the resistance threshold value Rth2 is 30 kΩ as shown in FIG. 4B.

As exemplified in FIG. 4B, in a case where there is, for example, no series resistor 1 but only the thermistor 28 exists, the temperature at which the protective function is activated in the low-temperature side (in other words, the temperature at which the detected resistance value Rs matches the resistance threshold value Rth2 by increasing due to a decrease in temperature) is about −2° C. On the contrary, if the series resistor 1 with the series resistance value R1=R1a=1 kΩ is coupled to the thermistor 28 in series, for example, then the temperature at which the protective function is activated in the low-temperature side is about −1° C. In addition, if the series resistance value R1 is increased, for example, to R1=R1b=2.2 kΩ, then the temperature at which the protective function is activated in the low-temperature side is about 0° C.

In other words, by adjusting the series resistance value R1, the actual temperature at which the protective function is activated in the low-temperature side is also adjusted. More specifically, the greater the series resistance value R1 becomes, the higher the actual temperature at which the protective function is activated in the low-temperature side becomes.

However, when the protective function is activated in a case where the series resistance value R1 is made to vary from a given value to another value, which is greater than the given value by a specified value, an amount of variation in the actual temperature is greater in the high-temperature side than in the low-temperature side due to the temperature characteristic of the thermistor 28. For example, if the series resistance value R1 varies from 1 kΩ to 2.2 kΩ, then the temperature for activating the protective function in the high-temperature side increases by about 12° C. from about 51° C. to about 63° C. as shown in FIG. 4A; meanwhile, the temperature for activating the protective function in the low-temperature side increases by only about 1° C. from about −1° C. to about 0° C. as shown in FIG. 4B.

Therefore, the temperature-detection circuit 18 of the present first embodiment comprising the resistor 1 coupled to the thermistor 28 in series has an effective circuit configuration particularly for adjusting the temperature for activating the protective function in the high-temperature side relatively remarkably while reducing an amount of variation in the temperature for activating the protective function in the low-temperature side.

Contrarily, for relatively remarkably adjusting the temperature for activating the protective function in the low-temperature side while reducing the amount of variation in the temperature for activating the protective function in the high-temperature side, a resistor may be coupled to the thermistor 28 in parallel likewise a temperature-detection circuit 100 (see, FIG. 5A) in a second embodiment which will be mentioned later, and the resistance value of that parallel-coupled resistor may be adjusted. In addition, for remarkably adjusting the temperature for activating the protective function both in the high-temperature side and in the low-temperature side, a resistor each may be coupled to the thermistor 28 in series and in parallel likewise a temperature-detection circuit 110 (see, FIG. 6A) in a third embodiment which will be mentioned later, and the resistance value of each resistor may be adjusted.

The temperature-detection circuit 18 of the present first embodiment is designed such that the series resistance value R1 of the series resistor 1 is determined based on the characteristic of the battery 15; the resistance threshold values Rth1 and Rth2 (actually, the voltage-threshold-values Vth1 and Vth2) in the battery charger 40; and the resistance threshold value Rthd (actually, the voltage-threshold-value Vthd) in the tool body 60 so as to activate the protective function both in the battery charger 40 and in the tool body 60 at a desired temperature corresponding to the characteristic of the battery 15.

For example, if it is desired to forcibly stop the charging when the battery temperature becomes equal to or higher than 63° C. or equal to or lower than 0° C. during charging by the battery charger 40, and at the same time, forcibly stop the discharging to the motor 61 when the battery temperature becomes equal to or higher than 77° C. during discharging to the motor 61 in the tool body 60, then a resistor with the resistance value R1=2.2 kΩ may be used as the series resistor 1.

If the resistance threshold value Rth1 and the resistance threshold value Rthd are equally set to 4 kΩ, and at the same time, the protective function needs to be activated at the temperature equal to or higher than 60° C. in the high-temperature side both when charging and discharging, then a resistor with the resistance value R1=1 kΩ may be used as the series resistor 1.

In addition, for minimizing the amount of variation in the temperature for activating the protective function in the low-temperature side while flexibly adjusting the temperature for activating the protective function in the high-temperature side, the series resistance value R1 of the series resistor 1 may be equal to or smaller than 40% of the resistance value Rm of the thermistor 28 at a specified temperature within a normal temperature range which is from 10° C. to 40° C. The resistance value Rm of the thermistor 28 of the present first embodiment is, for example, 10 kΩ at 25° C. Therefore, if the aforementioned specified temperature is 25° C., then the values (2.2 kΩ and 1 kΩ) exemplified as the series resistance value R1 are both equal to or smaller than 40% of the resistance value Rm of the thermistor 28 (10 kΩ) at the specified temperature.

(4) Effect of First Embodiment

As it is explained hereinbefore, in the present first embodiment, both the battery charger 40 and the tool body 60 execute the temperature protection control in accordance with the voltage value of the detection signal Vs, which is inputted from the battery pack 10, without identifying the type of the battery 15 when the battery pack 10 is attached. Contrarily, in the battery pack 10, a desired control can be executed at a desired temperature both in the battery charger 40 and the tool body 60 as a result of appropriately determining the series resistance value R1 of the series resistor 1 in accordance with the characteristic of the battery 15.

Specifically, in the present first embodiment, the series resistance value R1 is set to a value, at which charging and discharging are each permitted if the temperature is within a desired range and forcibly stopped if the temperature is not within the desired range, based on the characteristic of the battery 15; the resistance-temperature characteristic of the thermistor 28; threshold values set in the battery charger 40 and the tool body 60; and the like.

The temperature to forcibly stop the charging and discharging can be adjusted appropriately by means of the series resistance value R1. In other words, the temperature range to forcibly stop charging while charging and the temperature range to forcibly stop discharging while discharging can be appropriately set for each battery pack (that is, for each type of battery) by appropriately setting the series resistance value R1 in accordance with the type of the battery 15.

The battery charger 40 and the tool body 60 thus can execute appropriate temperature protection control on batteries with different characteristics in accordance with the characteristic and the battery temperature of each battery without identifying the type of the battery 15.

In addition, the battery charger 40 compares the detected resistance value Rs of the temperature-detection circuit 18 of the battery pack 10 with the resistance threshold values Rth1 and Rth2 that are set in advance and are independent of the characteristic of the battery 15, and executes the temperature protection control in accordance with the result of this comparison. However, in actual fact, the battery charger 40 compares the voltage value of the detection signal Vs inputted from the battery pack 10 (a value corresponding to the detected resistance value Rs) with the voltage-threshold-values Vth1 and VRth2 that are set in advance and are independent of the characteristic of the battery 15 (values respectively corresponding to the resistance threshold values Rth1 and Rth2), and executes the temperature protection control in accordance with the result of this comparison. The tool body 60 also compares the voltage value of the detection signal Vs inputted from the battery pack 10 with the voltage-threshold-value Vthd that is set in advance and is independent of the characteristic of the battery 15 (in other words, comparing the detected resistance value Rs with the resistance threshold value Rthd), and executes the temperature protection control in accordance with the result of this comparison.

Contrarily, in the battery pack 10, the series resistance value R1 of the temperature-detection circuit 18 is set such that the detected resistance value Rs matches the resistance threshold value Rth1 when the battery temperature has increased to reach a desired permitted upper limit value that corresponds to the characteristic of the battery 15 and at the same time, such that the detected resistance value Rs matches the resistance threshold value Rth2 when the battery temperature has decreased to be equal to or smaller than a desired permitted lower limit that corresponds to the characteristic of the battery 15.

As a result of the series resistance value R1 being set as mentioned above in the battery pack 10, the battery charger 40 can execute the temperature protection control without identifying the type of battery by means of the voltage-threshold-values Vth1 and Vth2, which are independent of the characteristic of the battery 15.

In addition, the resistor 1 is coupled to the thermistor 28 in series in the temperature-detection circuit 18 of the present first embodiment. By coupling the resistor 1 to the thermistor 28 in series, the overall resistance value of the temperature-detection circuit 18 (the detected resistance value Rs) can be increased accordingly compared to that in a case where no resistor 1 exists; thus the detection value indicated by the detection signal Vs can be increased. In other words, the voltage value of the detection signal Vs for the same temperature can be shifted to a greater voltage value compared to a case where no series resistor 1 exists.

Therefore, as a result of appropriately setting the resistance value R1 of the series resistor 1 in accordance with the characteristic of the battery 15, the battery charger 40 and the tool body 60 can execute appropriate temperature protection control in accordance with the characteristic and the battery temperature of the battery 15, without identifying the type of the battery 15.

Second Embodiment

The temperature-detection circuit included in the battery pack can be made in various configurations without being limited to the configurations of the temperature-detection circuit 18 of the first embodiment shown in FIG. 1. One example of other configurations of the temperature-detection circuit will be explained as a second embodiment.

Figure 5A:
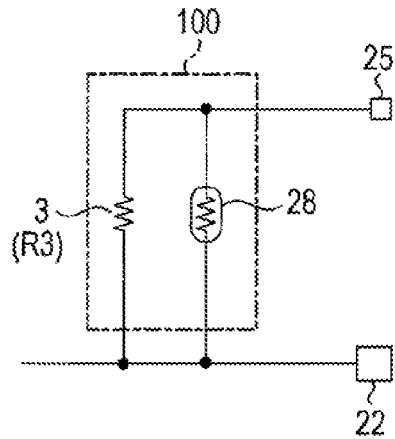
FIG. 5A is a circuit diagram showing a temperature-detection circuit of a second embodiment.

The temperature-detection circuit 100 of the present second embodiment comprises the thermistor 28 and a resistor 3 as shown in FIG. 5A. The resistor 3 is coupled to the thermistor 28 in parallel (hereinafter, the resistor 3 is also referred to as a "parallel resistor 3"). Thus, the overall resistance value of the temperature-detection circuit 100 (the detected resistance value Rs) is expressed in the following formula (3). R3 is a resistance value of the resistor 3.

$$Rs = Rm \cdot R3/(Rm+R3) \qquad (3)$$

Therefore, the detected resistance value Rs varies in accordance with the battery temperature; the higher the battery temperature becomes, the lower the detected resistance value Rs becomes. The detected resistance value Rs varies also in accordance with the resistance value (parallel resistance value) R3 of the parallel resistor 3; the smaller the parallel resistance value R3 becomes, the smaller the detected resistance value Rs becomes.

The higher the battery temperature becomes, the lower the voltage value of the detection signal Vs that is outputted from the temperature-detection circuit 100 to the battery charger 40 when the temperature-detection circuit 100 is coupled to the battery charger 40 becomes. And, the voltage value of the detection signal Vs depends on the parallel resistance value R3; the smaller the parallel resistance value R3 becomes, the smaller the voltage value of the detection signal Vs becomes.

Therefore, the actual temperature at which the battery charger 40 and the tool body 60 should activate the protective function can be adjusted by adjusting the parallel resistance value R3. More specifically, the temperature characteristic of the detected resistance value Rs can be shifted by adjusting the parallel resistance value R3 of the parallel resistor 3 that is coupled to the thermistor 28 in parallel as shown in FIG. 5B.

Figure 5B:
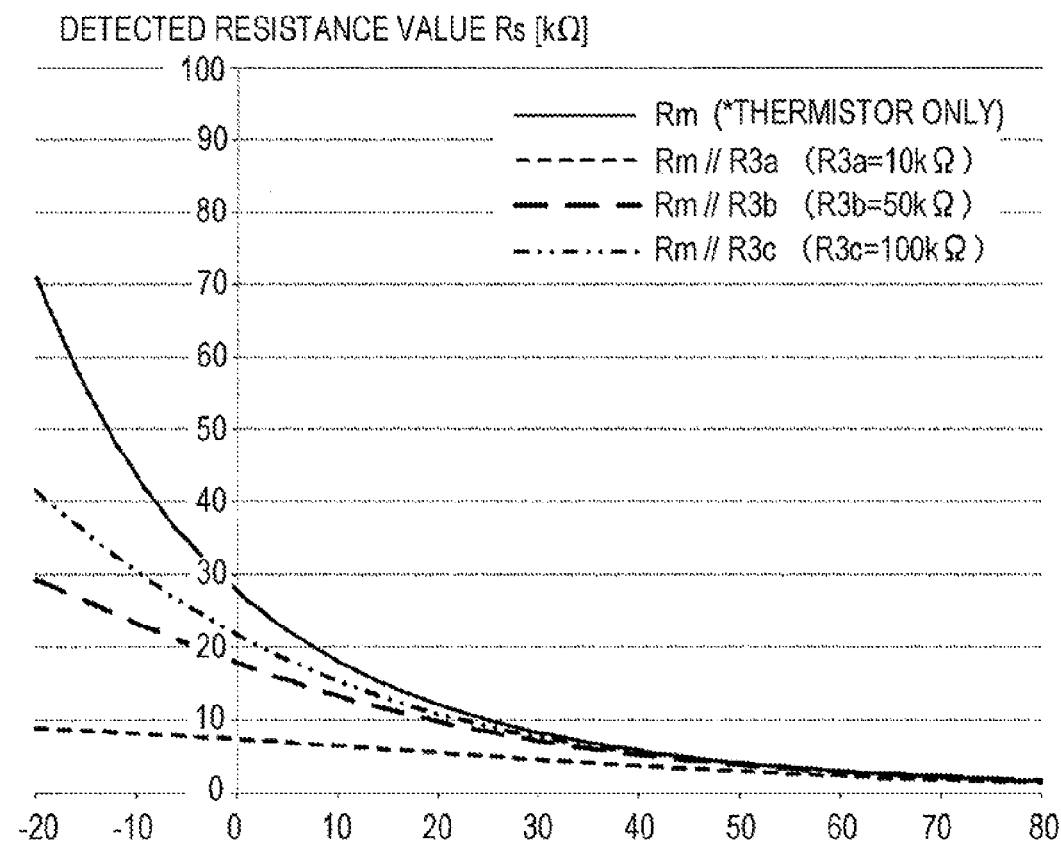
FIG. 5B is an explanatory diagram showing a temperature characteristic of a detected resistance value Rs of the temperature-detection circuit.

As apparent from FIG. 5B, the higher the temperature is, the smaller the shifted amount by the parallel resistor 3 becomes, and the lower the temperature is, the greater the shifted amount by the parallel resistor 3 becomes. In other words, by using the parallel resistor 3, the temperature for activating the protective function in the low-temperature side can be adjusted dynamically while reducing variation in the temperature for activating the protective function in the high-temperature side.

More specifically, the smaller the parallel resistance value R3 is, the lower the temperature for activating the protective function in the low-temperature side can be. For example, suppose that the resistance threshold value Rth2 is set to 30 kΩ, and if there is no parallel resistor 3 but only the thermistor 28 exists, then the protective function is activated when the battery temperature is below 0° C. On the contrary, if the temperature at which the protective function should be activated needs to be lowered down to a lower limit temperature of near −10° C., for example, then the parallel resistor 3 with the resistance value R3=100 kΩ may be used. If the temperature at which the protective function should be activated needs to be lowered down to the lower limit temperature, for example, near −20° C., then the parallel resistor 3 with the resistance value R3=50 kΩ may be used.

Note that, of the control parameters, one that corresponds to the low-temperature side region which is actually set on the battery charger 40 is the voltage-threshold-value Vth2. Thus, the aforementioned example of the lower limit temperature of near −10° C. can be explained in a different way; that is, the parallel resistance value R3 may be determined such that the voltage value of the detection signal Vs matches the voltage-threshold-value Vth2 when the battery temperature is at the lower limit temperature of near −10° C.

As explained above, the temperature-detection circuit 100 of the present second embodiment, in which the resistor 3 is coupled to the thermistor 28 in parallel, has an effective circuit configuration mainly for drastically adjusting the temperature for activating the protective function in the low-temperature side while reducing the amount of variation in the temperature for activating the protective function in the high-temperature side.

The temperature-detection circuit 100 of the present second embodiment is also designed such that the parallel resistance value R3 of the parallel resistor 3 is determined based on the characteristic of the battery 15; the resistance threshold values Rth1 and Rth2 (actually, the voltage-threshold-values Vth1 and Vth2) in the battery charger 40; and the resistance threshold value Rthd (actually, the voltage-threshold-value Vthd) in the tool body so as to activate the protective function both in the battery charger 40 and the tool body 60 each at a desired temperature corresponding to the characteristic of the battery 15.

Suppose that, for example, both of the resistance threshold value Rth1 in the battery charger 40 and the resistance threshold value Rthd in the tool body 60 are set to 5 kΩ, and the resistance threshold value Rth2 in the battery charger 40 is set to 30 kΩ; if it is required, for example, to forcibly stop charging and discharging when the battery temperature becomes equal to or higher than 50° C. both during charging and discharging, and at the same time, forcibly stop charging when the battery temperature becomes equal to or below −10° C. during charging, then a resistor with the parallel resistance value R3 of about 100 kΩ may be used as the parallel resistor 3.

In addition, for minimizing the amount of variation in the temperature for activating the protective function in the high-temperature side while flexibly adjusting the temperature for activating the protective function in the low-temperature side, the parallel resistance value R3 of the parallel resistor 3 may be four or more times greater than the resistance value Rm of the thermistor 28 at a specified temperature within the normal temperature range from 10° C. to 40° C. The thermistor 28 of the present second embodiment has the resistance value Rm of 10 kΩ at 25° C. as already mentioned. Thus, if the aforementioned specified temperature is 25° C., then the parallel resistance value R3 may be set to 40 kΩ or more.

As explained hereinbefore, the resistor R3 is coupled to the thermistor 28 in parallel in the temperature-detection circuit 100 of the present second embodiment. By coupling the resistor 3 to the thermistor 28 in parallel, the overall resistance value of the temperature-detection circuit 100 (the detected resistance value Rs) can be decreased accordingly compared to that in a case where no resistor 3 exists; thus the voltage value of the detection signal Vs can be decreased. In other words, the voltage value of the detection signal Vs for the same temperature can be shifted to a smaller voltage value compared to a case where no parallel resistor 3 exists.

Therefore, as a result of appropriately setting the resistance value R3 of the parallel resistor 3 in accordance with the characteristic of the battery 15, the battery charger 40 and the tool body 60 can execute appropriate temperature protection control in accordance with the characteristic and the battery temperature of the battery 15, without identifying the type of the battery 15.

Third Embodiment

Figure 6A:
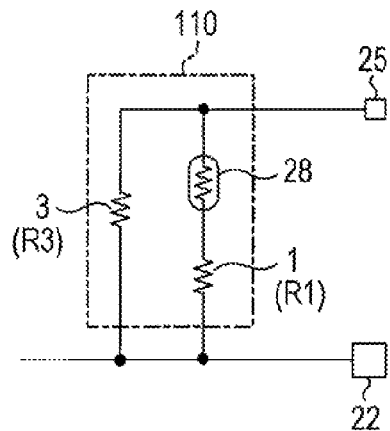
FIG. 6A is a circuit diagram showing a temperature-detection circuit of a third embodiment.

One example of other configurations of the temperature-detection circuit will be explained as a third embodiment. The temperature-detection circuit 110 of the present third embodiment comprises the thermistor 28; the series resistor 1; and, the parallel resistor 3 as shown in FIG. 6A. The series resistor 1 is coupled to the thermistor 28 in series. The parallel resistor 3 is coupled to the thermistor 28 in parallel. More specifically, the parallel resistor 3 is coupled in parallel to the series circuit that is formed with the thermistor 28 and the series resistor 1.

Thus, the overall resistance value of the temperature-detection circuit 110 (the detected resistance value Rs) is expressed in the following formula (4).

$$Rs=(Rm+R1)\cdot R3/(Rm+R1+R3) \qquad (4)$$

Therefore, both the detected resistance value Rs and the voltage value of the detection signal Vs corresponding to this detected resistance value Rs vary in accordance with the battery temperature; the higher the battery temperature becomes, the lower the detected resistance value Rs and the voltage value of the detection signal Vs become. The detected resistance value Rs and the voltage value of the detection signal Vs vary also in accordance with the series resistance value R1 and the parallel resistance value R3; the greater the series resistance value R1 becomes, the greater the detected resistance value Rs and the voltage value of the detection signal Vs become, and the smaller the parallel resistance value R3 becomes, the smaller the detected resistance value Rs and the voltage value of the detection signal Vs become.

Of all the temperature characteristics of the detected resistance value Rs, the series resistance value R1 affects particularly the characteristics in the high-temperature side region. As exemplified in FIG. 6B, the greater the series resistance value R1 is, the higher the detected resistance value Rs in the high-temperature side region can be. Contrarily, of all the temperature characteristics of the detected resistance value Rs, the parallel resistance value R3 affects particularly the characteristics in the low-temperature side region. As exemplified in FIG. 6B, the smaller the parallel resistance value R3 is, the lower the detected resistance value Rs in the low-temperature side region can be.

Thus, if the temperature for activating the protective function needs to be dynamically adjusted both in the high-temperature side and the low-temperature side, then the series resistor 1 and the parallel resistor 3 may be disposed as shown in the temperature-detection circuit 110 of the present third embodiment may be disposed, and the series resistance value R1 of the series resistor 1 and the parallel resistance value R3 of the parallel resistor 3 may be adjusted in accordance with a desired permitted resistance range for charging.

Figure 6B:
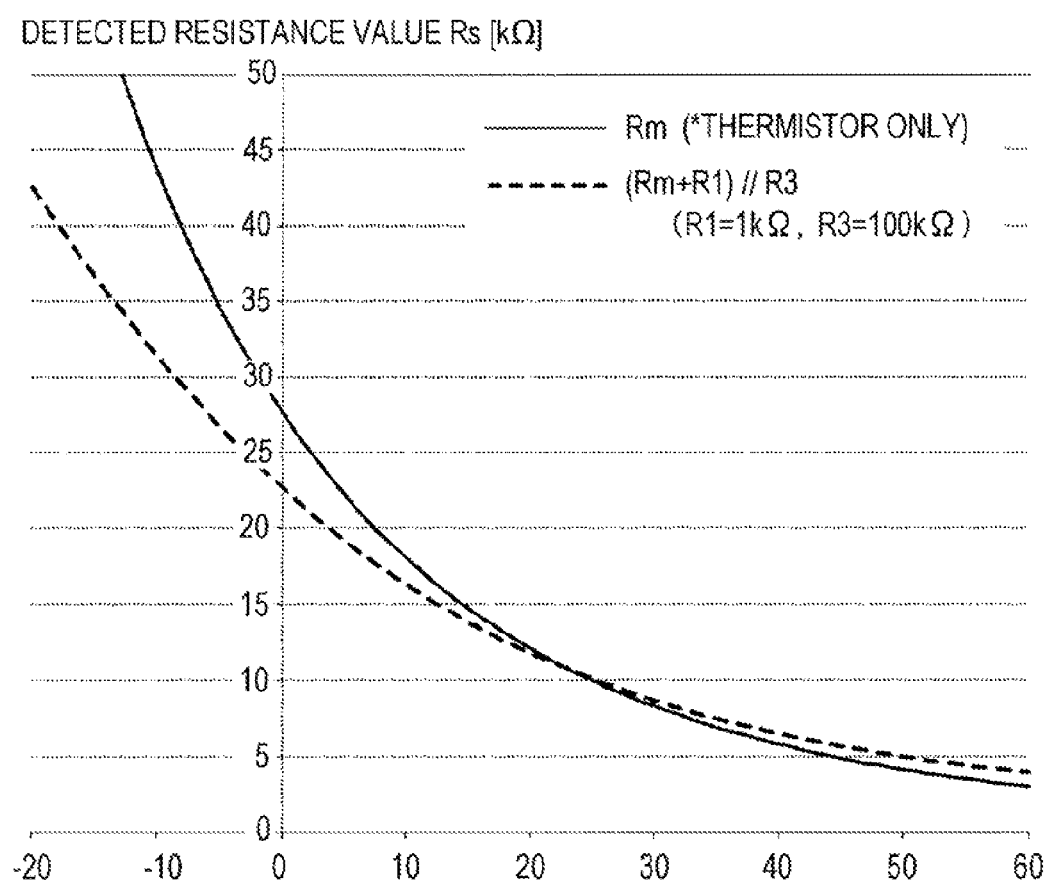
FIG. 6B is an explanatory diagram showing a temperature characteristic of a detected resistance value Rs of the temperature-detection circuit.

For example, suppose that the resistance threshold value Rth1 in the battery charger 40 and the resistance threshold value Rthd in the tool body 60 are both set to 5 kΩ, and the resistance threshold value Rth2 in the battery charger 40 is set to 30 kΩ; if it is required to forcibly stop charging and discharging when the battery temperature becomes equal to or higher than 50° C. both during charging and discharging, and at the same time forcibly stop charging when the battery temperature becomes equal to or below −8° C. during charging, then the temperature-detection circuit 110 that has a characteristic as shown in dashed line in FIG. 6B may be configured. In other words, a resistor of about 1 kΩ may be used as the series resistor 1 and a resistor of about 100 kΩ may be used as the parallel resistor 3.

Fourth Embodiment

Figure 7:
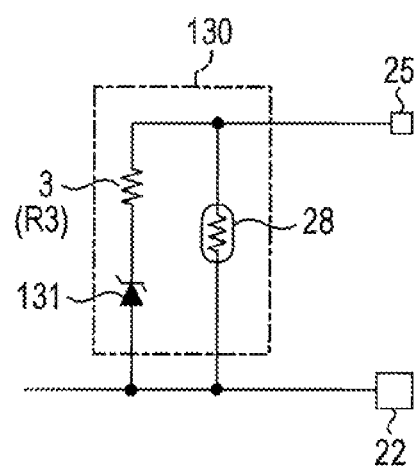
FIG. 7 is a circuit diagram showing a temperature-detection circuit of a fourth embodiment.

One example of other configurations of the temperature-detection circuit will be explained as a fourth embodiment. A temperature-detection circuit 130 of the present fourth embodiment comprises the thermistor 28; the parallel resistor 3; and a Zener diode 131, as shown in FIG. 7. The parallel resistor 3 and the Zener diode 131 are coupled to each other in series to form a series circuit. This series circuit is coupled to the thermistor 28 in parallel.

In the temperature-detection circuit 130 that is configured as above, the Zener diode 131 does not break down in a region where the battery temperature is high, since voltage between both ends of the thermistor 28 (in other words, the voltage value of the detection signal Vs) is low; thus, the parallel resistor 3 does not function practically. In other words, the temperature-detection circuit 130 is substantially equivalent to the circuit that comprises only the thermistor 28.

Meanwhile, the voltage between both ends of the thermistor 28 increases as the battery temperature decreases; and when the voltage is equal to or more than a given fixed level, the Zener diode 131 breaks down and an electric current flows through the parallel resistor 3. In other words, the temperature-detection circuit 130 starts to function as a parallel circuit of the thermistor 28 and the parallel resistor 3.

As a result, the temperature-detection circuit 130 of the present fourth embodiment can appropriately meet a need of not letting the parallel resistor 3 function in a region at or above a given fixed temperature, but letting the parallel resistor 3 function in a region below the fixed temperature. For example, if it is desired not to let the parallel resistor 3 function in a region at or above 0° C., but to let the parallel resistor 3 function only in a region below 0° C., then the parallel resistance value R3 of the parallel resistor 3 and the characteristics of the Zener diode 131 to be used may be determined based on the resistance value Rm of the thermistor 28 at 0° C. and the voltage value between both ends of the thermistor 28 so that the Zener diode 131 breaks down in the region below 0° C.

Other Embodiments

Embodiments of the present disclosure are explained hereinbefore; however, the present disclosure may take various modes without being limited to the embodiments as explained above.

(1) In each of the temperature-detection circuits 18, 100, and 110 in the first embodiment to the third embodiment, the detected resistance value Rs which is the overall resistance value of the temperature-detection circuit is fixed for the same temperature. Contrarily, a the temperature-detection circuit may be configured such that the detected resistance value Rs varies for the same temperature between a case where the circuit is coupled to the battery charger and a case where the circuit is coupled to the tool body. Specific example of the circuit is shown in FIG. 8.

Figure 8:
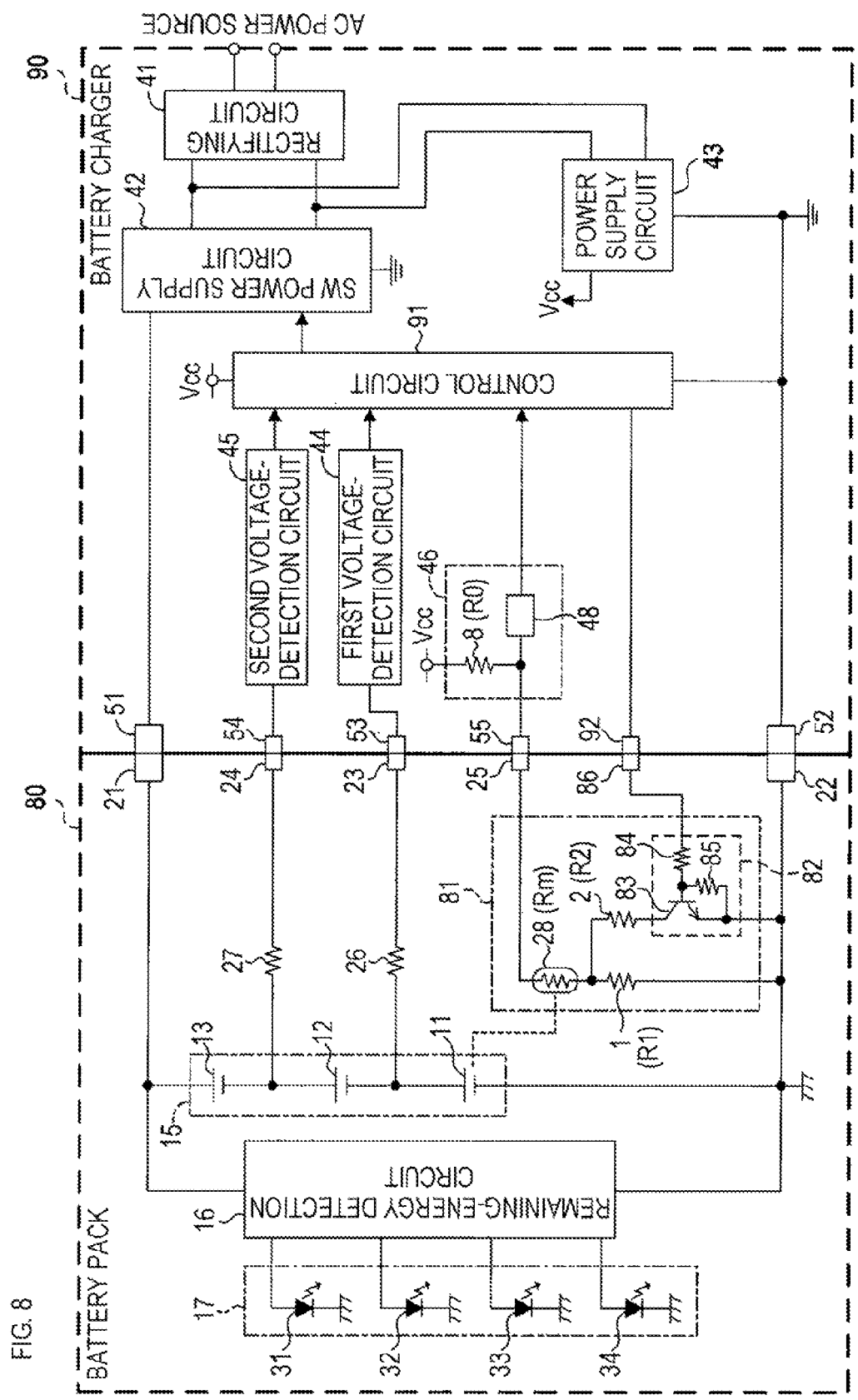
FIG. 8 is a configuration diagram showing another example of the charging system.

The charging system shown in FIG. 8 is different from the charging system of the first embodiment shown in FIG. 1 in the following four points. The first point is a configuration of a temperature-detection circuit 81 of a battery pack 80. The second point is that the battery pack 80 comprises a command input terminal 86 as a terminal which is coupled to a battery charger 90. The third point is that the battery charger 90 comprises a command output terminal 92 which is coupled to the command input terminal 86 of the battery pack 80. And the fourth point is that a control circuit 91 of the battery charger 90 outputs a shift command signal from the command output terminal 92 to the battery pack 80.

In the temperature-detection circuit 81 in FIG. 8 comprises the series resistor 1 being coupled to the thermistor 28 in series, as well as a shift adjusting circuit, which is formed with a resistor 2 having the resistance value R2 and the switch circuit 82 coupled in series to each other, being coupled to the series resistor 1 in parallel.

The switch circuit 82 comprises a switching element 83. In an example shown in FIG. 8, the switching element 83 is the NPN bipolar transistor. A collector of the switching element 83 is coupled to the other end of the thermistor 28 via the resistor 2; an emitter of the switching element 83 is coupled to the negative-electrode terminal 22. A resistor 85 is coupled between a base and the emitter of the switching element 83. And the base of the switching element 83 is coupled to the command input terminal 86 via a resistor 84.

The shift command signal inputted into the command input terminal 86 is a binary signal that has its logic levels set to high-level or low-level. If the low-level signal is inputted as the shift command signal, then the switching element 83 is turned off; thus, no electric current flows to the resistor 2. Thus, the temperature-detection circuit 81 substantially functions as a circuit comprising only the thermistor 28 and the series resistor 1. On the contrary, if the high-level signal is inputted as the shift command signal, then the switching element 83 is turned on; thus, an electric current flows also to the resistor 2.

That is to say that, when the switching element 83 is turned on, the detected resistance value Rs of the entire temperature-detection circuit 81 becomes smaller than that of when the switching element 83 is turned off. Thus, the detected resistance value Rs in a case where the battery pack 80 is attached to the battery charger 90 and the resistor 2 is functioning differs from the detected resistance value Rs in a case where the battery pack 80 is attached to the tool body 60 and the resistor 2 is not functioning.

For this reason, if permitted temperatures for when the battery pack 80 is charged and discharged need to be set differently; for example, in a case where a permitted temperature in the high-temperature side when the battery pack 80 is attached to the battery charger 90 and the battery 15 is being charged should be set lower than a permitted temperature in the high-temperature side when the battery pack 80 is attached to the tool body 60 and being discharged to the motor 61, then the configuration of the temperature-detection circuit 81 in FIG. 8 may be adopted.

Additionally, it is anticipated that, for example, it may be difficult to activate the protective function at a desired temperature both when the battery pack 80 is charged and when the battery pack 80 is discharged if the detected resistance value Rs of the temperature-detection circuit is fixed, depending on the difference between the resistance threshold value Rth1 in the battery charger side and the resistance threshold value Rthd in the tool body side. In such a case, by adopting the temperature-detection circuit 81 in FIG. 8, which can vary the detected resistance value Rs between when the battery pack 80 is charged and when the battery pack 80 is discharged, activation of the protective function at a desired temperature will be possible both when the battery pack 80 is charged and when the battery pack 80 is discharged.

Figure 9:
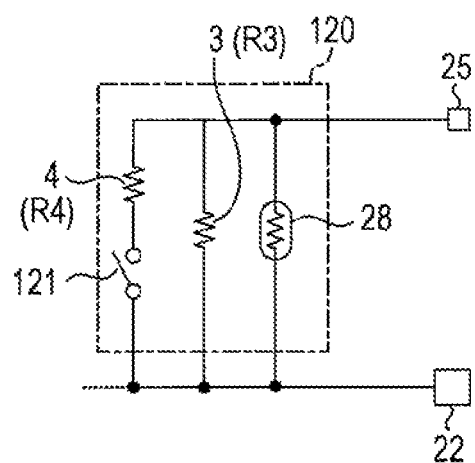
FIG. 9 is a circuit diagram showing another example of the temperature-detection circuit.

(2) A configuration shown in FIG. 9, for example, may be adopted as an example of other configuration of temperature-detection circuit. A temperature-detection circuit 120 shown in FIG. 9 comprises two parallel resistors 3 and 4 each coupled to the thermistor 28 in parallel. A switch 121 is coupled to the parallel resistor 4 in series. This switch 121 is turned on or off in accordance with the shift command signal from an external device, to which the battery pack is attached.

No electric current flows to the parallel resistor 4 when the switch 121 is turned off; thus, the temperature-detection circuit 120 substantially functions as a circuit that comprises only one parallel resistor 3 coupled to the thermistor 28 in parallel. On the contrary, an electric current flows also to the parallel resistor 4 when the switch 121 is turned on; thus, the temperature-detection circuit 120 functions as a circuit that comprises two parallel resistors 3 and 4 coupled to the thermistor 28 in parallel.

Therefore, the temperature-detection circuit 120 that is configured as shown in FIG. 9 may be adopted, for example, in a case where the permitted temperature in a low-temperature region needs to be mainly adjusted dynamically and where the amount of adjustment needs to be variably set by an external device.

(3) A method of dynamically adjusting the permitted temperature in the low-temperature region is not limited to coupling the resistor to the thermistor 28 in parallel. The permitted temperature in the low-temperature region can also be dynamically adjusted by means of a configuration that comprises only the thermistor 28 and the series resistor.

More specifically, a constant B (thermistor constant) of the thermistor 28 is adjusted in accordance with the type of the battery 15. The constant B is a constant that indicates variation of the resistance value of the thermistor 28 in relation to temperature variation. By using the thermistor 28 with different constants B, the permitted temperature in the low-temperature region can be varied remarkably while reducing an amount of variation of the permitted temperature in a high-temperature region as exemplified in FIG. 10 even by means of the configuration that comprises only the thermistor 28 and a series resistor.

Figure 10:
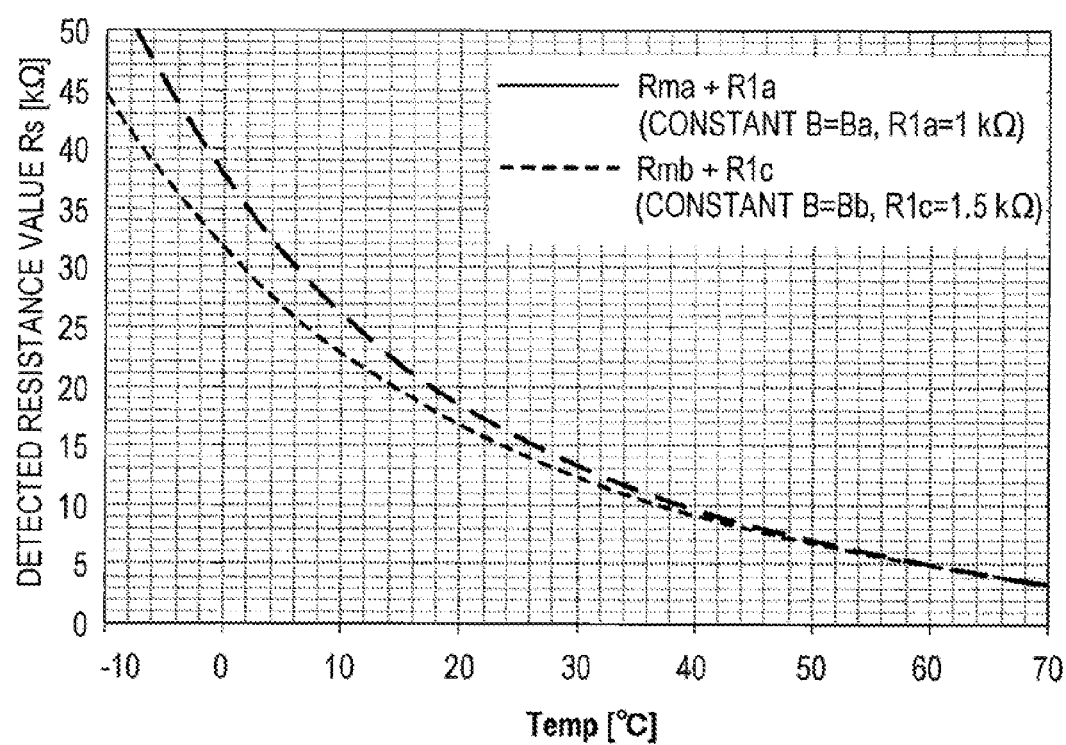
FIG. 10 is an explanatory diagram to describe variation in the temperature characteristic when a constant B of a thermistor is varied.

FIG. 10 shows the temperature characteristic of the temperature-detection circuit with the constant B being Ba and with the series resistance value R1 being 1 kΩ; and the temperature characteristic of the temperature-detection circuit with the constant B being Bb (≠Ba) and with the series resistance value R1 being 1.5 kΩ, as the temperature characteristic of the detected resistance value Rs of the temperature-detection circuit formed by coupling the series resistor 1 to the thermistor 28 in serial.

By thus adjusting at least the constant B of the thermistor 28, it is also possible to attain an effect equivalent to one that can be attained by coupling the parallel resistor 3 to the thermistor 28 in parallel as shown in FIG. 5A.

(4) Specific configurations of the temperature-detection circuit are not limited to each kind of the aforementioned configurations of the temperature-detection circuit. That is to say that, methods of coupling the resistors to the thermistor 28; the number of resistors to couple to the thermistor 28; the resistance value of the resistors to be coupled to the thermistor 28; or the like can be appropriately determined based on the characteristic of the battery 15; the control parameters (each threshold value) on the external device to which the battery pack is attached; or the like.

(5) It is not essential to use a thermistor with a negative characteristic as the temperature-detection element used in the temperature-detection circuit. The present disclosure can be applied to a temperature-detection circuit using a thermistor whose temperature characteristic is not a negative characteristic. And, a use of a thermistor as the temperature-detection element is not essential in itself. The present disclosure can be applied to a temperature-detection circuit that uses a temperature-detection element other than a thermistor.

(6) The external device, to which the present disclosure can be applied, is not limited to the battery chargers 40 and 90 shown in FIG. 1 and FIG. 8; or the tool body 60 shown in FIG. 2. The present disclosure can be applied to any external devices that can be used with a battery pack attached thereto, wherein the battery pack comprises a temperature-detection circuit that is configured to be able to output a detection signal Vs which is in accordance with a temperature (in other words, to be able to output information indicating a detected resistance value Rs which is in accordance with the temperature).

(7) The aforementioned temperature protection control is merely an example of a control that the external device executes in accordance with the voltage value of the detection signal Vs (information indicating the detected resistance value Rs) outputted from the temperature-detection circuit. Specific contents of processing, which the external device executes in accordance with the voltage value of the detection signal Vs from the temperature-detection circuit, is not particularly limited. The control parameters, which are set on the external device so that the external device executes the processing in accordance with the voltage value of the detection signal Vs, are also not limited to each of the aforementioned threshold values. Control parameters can be set in the external device in accordance with processing to be executed; and each processing in accordance with the voltage value of the detection signal Vs can be executed with those control parameters.

Further, generating and outputting the detection signal Vs as information indicating the detected resistance value Rs of the temperature-detection circuit is also merely an example. It can be appropriately determined what specific detection signals should be generated and outputted, as far as information indicating the detected resistance value Rs can be transmitted to the external device. For example, it may be configured to generate digital data indicating the detected resistance value Rs inside the battery pack, and to transmit the digital data to the external device.

(8) In addition, it may also be configured to separate the functions of one component in the aforementioned embodiments into a plurality of components; or it may also be configured to combine the functions of a plurality of components into one component. Alternatively, at least a part of the configurations of the aforementioned embodiments may be replaced with a known configuration that has a similar function. A part of the aforementioned embodiments may be omitted. At least a part of the configurations of the aforementioned embodiments may be added to or replace the configuration of the aforementioned another embodiment. Any modes included in the technical concept that is defined only by the languages recited in the claims are embodiments of the present disclosure.

What is claimed is:

1. A battery-connection system comprising:
a battery pack; and,
a connecting device that is configured so that the battery pack can be attached thereto and detached therefrom,
wherein the battery pack comprises
a battery, and,
a temperature-detection circuit that is configured to be able to output a detection signal corresponding to a temperature of a specific location inside the battery pack;
wherein the temperature-detection circuit comprises
a temperature-detection element that is disposed at the specific location and possesses a resistance-temperature characteristic by which a resistance value of the temperature-detection element varies in accordance with the temperature of the specific location, and,
at least one resistance element that is coupled to the temperature-detection element in series and/or in parallel and has a resistance value that is determined based on the characteristic of the battery;
wherein the temperature-detection circuit is configured to be able to output the detection signal that is based on the resistance value of the temperature-detection element and the resistance value of the at least one resistance element; and,
wherein the connecting device comprises
an operating unit that is configured to be able to execute a battery-related operation which is at least one of an operation using electric power from the battery and charging operation of the battery, when the battery pack is attached to the connecting device, and,
a temperature-related control unit that is configured to execute a specific temperature-related control in accordance with the detection signal outputted from the battery pack when the battery pack is attached to the connecting device, without identifying a type of the battery.

2. The battery-connection system according to claim 1,
wherein the detection signal indicates a detection value corresponding to the temperature of the specific location;
wherein the connecting device is configured to compare the detection value indicated by the detection signal with a preset threshold value that is independent of the characteristic of the battery, and to execute the temperature-related control based on a result of the comparison; and,
wherein the temperature-detection circuit is configured to output the detection signal that indicates a specific detection value corresponding to the threshold value when the temperature of the specific location has reached a specific temperature.

3. The battery-connection system according to claim 2,
wherein the at least one resistance element is coupled to the temperature-detection element in series; and,
wherein the temperature-detection circuit is configured such that the greater the resistance value of the at least one resistance element is, the higher the specific temperature at which the temperature-detection circuit outputs the detection signal indicating the specific detection value becomes.

4. The battery-connection system according to claim 2,
wherein the at least one resistance element is coupled to the temperature-detection element in parallel; and,
wherein the temperature-detection circuit is configured such that the smaller the resistance value of the at least one resistance element is, the lower the specific temperature at which the temperature-detection circuit outputs the detection signal indicating the specific detection value becomes.

5. The battery-connection system according to claim 1,
wherein the at least one resistance element is coupled to the temperature-detection element in series.

6. The battery-connection system according to claim 5,
wherein the resistance-temperature characteristic of the temperature-detection element is a negative characteristic; and,
wherein the resistance value of the at least one resistance element is equal to or below 40% of the resistance value of the temperature-detection element when the temperature is at a given temperature within a normal temperature range, the normal temperature range being from 10° C. to 40° C.

7. The battery-connection system according to claim 1,
wherein the at least one resistance element is coupled to the temperature-detection element in parallel.

8. The battery-connection system according to claim 7,
wherein the resistance-temperature characteristic of the temperature-detection element is a negative characteristic; and,
wherein the resistance value of the at least one resistance element is four times or more of the resistance value of the temperature-detection element when the temperature is at a given temperature within a normal temperature range, the normal temperature range being from 10° C. to 40° C.

9. The battery-connection system according to claim 7,
wherein the resistance-temperature characteristic of the temperature-detection element is a negative characteristic; and,
wherein the battery-connection system comprises a series circuit that is coupled to the temperature-detection element in parallel and comprises the at least one resistance element and a Zener diode that is coupled to the at least one resistance element in series.

10. The battery-connection system according to claim 1,
wherein the temperature-detection element comprises a thermistor.

11. A battery pack comprising:
a battery;
a temperature-detection circuit that is configured to be able to output a detection signal indicating a detection value corresponding to a temperature of a specific location inside the battery pack; and
a terminal that is configured to be electrically coupled to an external device to which the battery pack is attached,
wherein the temperature-detection circuit comprises
a temperature-detection element that is disposed at the specific location and is configured such that a resistance value of the temperature-detection element varies in accordance with the temperature of the specific location, and,
at least one resistance element that is coupled to the temperature-detection element in series and/or in parallel; and, wherein the temperature-detection circuit is configured to be able to output to the terminal the detection signal which is based on the resistance value of the temperature-detection element and the resistance value of the at least one resistance element, and is configured such that the detection signal outputted by the temperature-detection circuit indicates a content that corresponds to a control parameter when the temperature of the specific location has reached a specific temperature, the control parameter being set on the external device and being independent of a type of the battery.

12. The battery pack according to claim 11,
wherein the temperature-detection circuit is configured to output the detection signal indicating a specific detection value corresponding to the control parameter when the temperature of the specific location has reached the specific temperature.

13. The battery pack according to claim 11,
wherein the temperature-detection element comprises a thermistor.

14. A battery pack comprising:
a battery;
a temperature-detection circuit that is configured to be able to output a detection signal indicating a detection value corresponding to a temperature of a specific location inside the battery pack; and
a terminal that is configured to be electrically coupled to an external device to which the battery pack is attached,
wherein the temperature-detection circuit comprises
a temperature-detection element that is disposed at the specific location and is configured such that a resistance value of the temperature-detection element varies in accordance with the temperature of the specific location, and,
at least one resistance element that is coupled to the temperature-detection element in series and/or in parallel; and,
wherein the temperature-detection circuit is configured to be able to output, directly from the temperature-detection circuit to the terminal, the detection signal which is based on the resistance value of the temperature-detection element and the resistance value of the at least one resistance element, and is configured such that the detection signal outputted by the temperature-detection circuit indicates a content that corresponds to a control parameter when the temperature of the specific location has reached a specific temperature, the control parameter being set on the external device attached and being independent of a characteristic of the battery.

15. The battery pack according to claim 14,
wherein the temperature-detection circuit is configured to output the detection signal indicating a specific detection value corresponding to the control parameter when the temperature of the specific location has reached the specific temperature.

16. The battery pack according to claim 14,
wherein the temperature-detection element comprises a thermistor.

* * * * *